US012706431B2

(12) United States Patent
Jain et al.

(10) Patent No.: US 12,706,431 B2
(45) Date of Patent: Aug. 11, 2026

(54) BEAM INTENSITY PROFILE TAILORING WITH A COMPOSITE, TAPERED OPTICAL FIBRE

(71) Applicant: THE UNIVERSITY OF SYDNEY, Sydney (AU)

(72) Inventors: Deepak Jain, Sydney (AU); Simon Fleming, Sydney (AU)

(73) Assignee: THE UNIVERSITY OF SYDNEY, Sydney (AU)

( * ) Notice: Subject to any disclaimer, the term of this patent is extended or adjusted under 35 U.S.C. 154(b) by 678 days.

(21) Appl. No.: 18/033,635

(22) PCT Filed: Oct. 28, 2021

(86) PCT No.: PCT/AU2021/051253
§ 371 (c)(1), (2) Date: Apr. 25, 2023

(87) PCT Pub. No.: WO2022/087667
PCT Pub. Date: May 5, 2022

(65) Prior Publication Data
US 2023/0327390 A1 Oct. 12, 2023

(30) Foreign Application Priority Data
Oct. 29, 2020 (AU) ................................ 2020903924

(51) Int. Cl.
*G02B 6/26* (2006.01)
*H01S 3/067* (2006.01)

(52) U.S. Cl.
CPC .... *H01S 3/06745* (2013.01); *H01S 2301/203* (2013.01)

(58) Field of Classification Search
CPC ........... H01S 3/06745; H01S 2301/203; G02B 27/0927; G02B 27/0994;
(Continued)

(56) References Cited

U.S. PATENT DOCUMENTS

| | | |
|---|---|---|
| 4,946,239 A | 8/1990 | Garmon |
| 5,729,643 A | 3/1998 | Hmelar et al. |

(Continued)

FOREIGN PATENT DOCUMENTS

| | | |
|---|---|---|
| CA | 2588938 A1 | 11/2008 |
| DE | 4209926 A1 | 9/1993 |

(Continued)

OTHER PUBLICATIONS

International Search Report for PCT/AU2021/051253 dated Dec. 20, 2021.

(Continued)

*Primary Examiner* — Jennifer Doan
(74) *Attorney, Agent, or Firm* — MOSER TABOADA

(57) ABSTRACT

A composite all optical-fibre based tapered photonic waveguide (110) including a single or multiple secondary waveguides (120) within or around a primary waveguide (118) is described. The composite optical fibre may also be termed abeam tailoring optical fibre (BT Fibre) (110). In use, at the larger secondary end (114) both the primary waveguide (118) and the secondary waveguide/s (120) may guide modes at a particular wavelength. However, at the same wavelength, adiabatically tapering down the waveguides (118, 120) reduces the dimensions of the secondary waveguide/s (120) such that all the secondary waveguide/s (120) become effectively non-guiding at the smaller primary end (112), whilst the primary waveguide (118) still guides. In other words, the composite optical fibre is a spatially modulating optical fibre (110).

16 Claims, 29 Drawing Sheets

(58) Field of Classification Search

CPC ...... G02B 2006/12195; G02B 6/02042; G02B 6/02314; G02B 6/26

See application file for complete search history.

(56) References Cited

U.S. PATENT DOCUMENTS

| | | | | |
|---|---|---|---|---|
| 6,655,857 | B2 * | 12/2003 | Allan | G02B 6/2551 385/96 |
| 7,054,528 | B2 | 5/2006 | Blumberg | |
| 7,359,593 | B2 * | 4/2008 | Little | G02B 6/1228 385/28 |
| 7,643,710 | B1 * | 1/2010 | Liu | B82Y 20/00 385/39 |
| 8,483,533 | B1 | 7/2013 | Mehl | |
| 8,620,126 | B2 | 12/2013 | Rajala et al. | |
| 8,781,269 | B2 | 7/2014 | Huber et al. | |
| 10,114,172 | B2 | 10/2018 | Holland et al. | |
| 2010/0210910 | A1 | 8/2010 | Shimotsu | |
| 2011/0064095 | A1 | 3/2011 | Gapontsev et al. | |
| 2015/0139595 | A1 | 5/2015 | Hugonnot et al. | |
| 2018/0088343 | A1 | 3/2018 | Kliner et al. | |
| 2018/0088357 | A1 | 3/2018 | Kliner et al. | |
| 2018/0088358 | A1 | 3/2018 | Kliner et al. | |
| 2018/0180818 | A1 * | 6/2018 | Jiang | G02B 6/1228 |
| 2019/0086611 | A1 * | 3/2019 | Daniel | G02B 6/305 |

FOREIGN PATENT DOCUMENTS

| | | | |
|---|---|---|---|
| GB | 1252732 | | 11/1971 |
| GB | 2179171 | A | 2/1987 |
| JP | 2002270928 | A | 9/2002 |
| WO | WO 2010/120958 | A1 | 10/2010 |
| WO | WO 2012/088361 | A2 | 6/2012 |

OTHER PUBLICATIONS

Amoiropoulos, Kostas et al., "Shaping Beam Profiles Using Plastic Optical Fiber Tapers with Application to Ice Sensors", Sensors 20.9 (2020):2503.

* cited by examiner $$NA = \sqrt{n_3^2 - n_1^2}$$

$$NA' = \sqrt{n_3^2 - n_2^2}$$

$$DN = n_3 - n_1$$

$$DN' = n_3 - n_2$$

$$Dn = n_2 - n_1$$

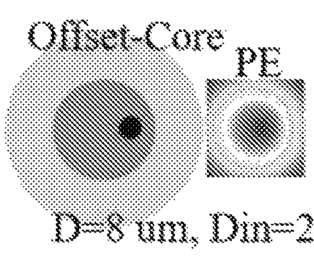
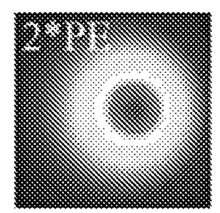
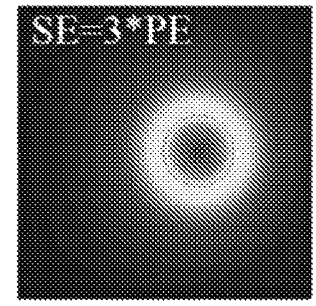
D=8 um, Din=2 um
Pitch=1 um
1.4502 $n_{eff}$ 1.4518 $n_{eff}$
FIGURE 17 0/1 $M_{(SW/CW)}$ (a) 1/5 $M_{(SW/CW)}$
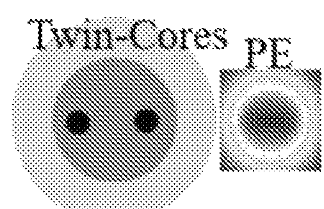
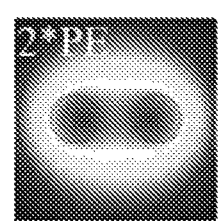
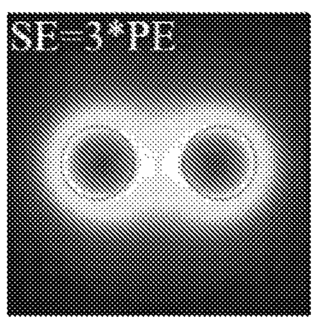
D=8 um, Din=2 um
Pitch=5/3 um
1.4504 $n_{eff}$ 1.4519 $n_{eff}$
FIGURE 18 0/1 $M_{(SW/CW)}$ (b) 2/7 $M_{(SW/CW)}$
Electric Field Intensity (V/m)
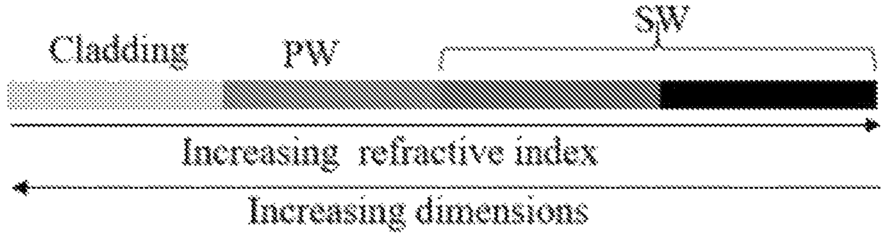

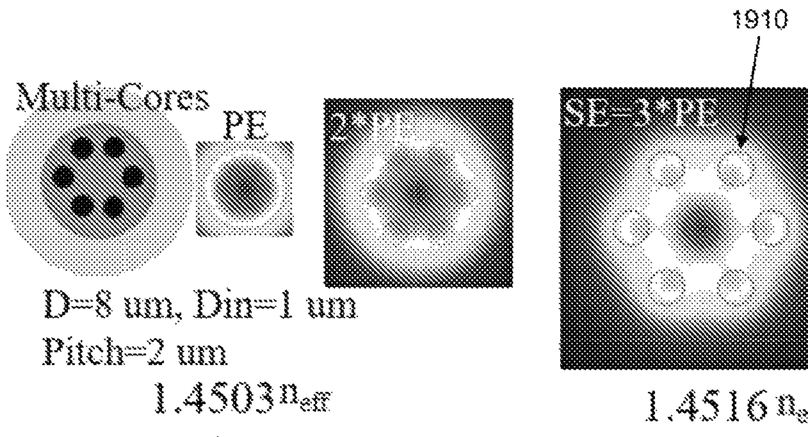
D=8 um, Din=1 um
Pitch=2 um
1.4503 $n_{eff}$ 1.4516 $n_{eff}$
FIGURE 19 0/1 $M_{(SW/CW)}$ (c) 1/5 $M_{(SW/CW)}$
Electric Field Intensity (V/m)
2010
Square Core
2012
PE
2*PE
SE=4*PE
2014
2016
D=6 um, Square side=3 um
Internal square side=2 um
1.4507 $n_{eff}$ 1.4536 $n_{eff}$
FIGURE 20 0/1 $M_{(SW/CW)}$ (d) 0/9 $M_{(SW/CW)}$
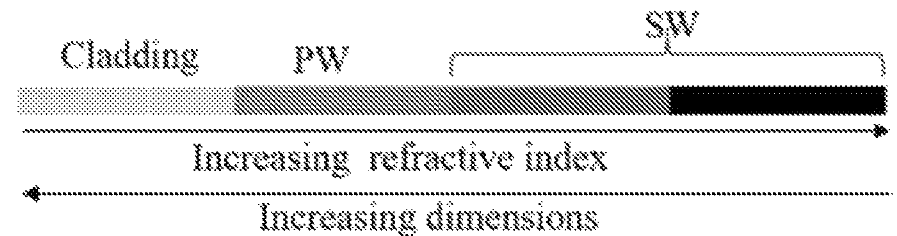

Primary End

Secondary End 1060 nm wavelength was used.
SMF
M-fibre
(X-axis)

(Y-axis)

(Z-axis)

Increasing offset

FIGURE 31A
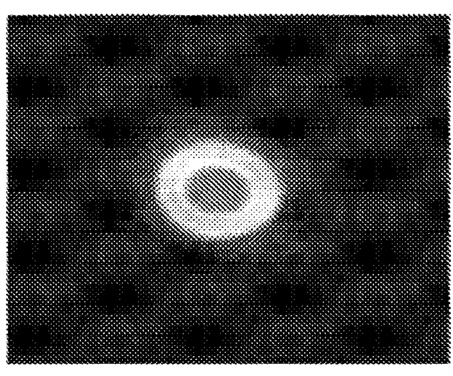
FIGURE 31B
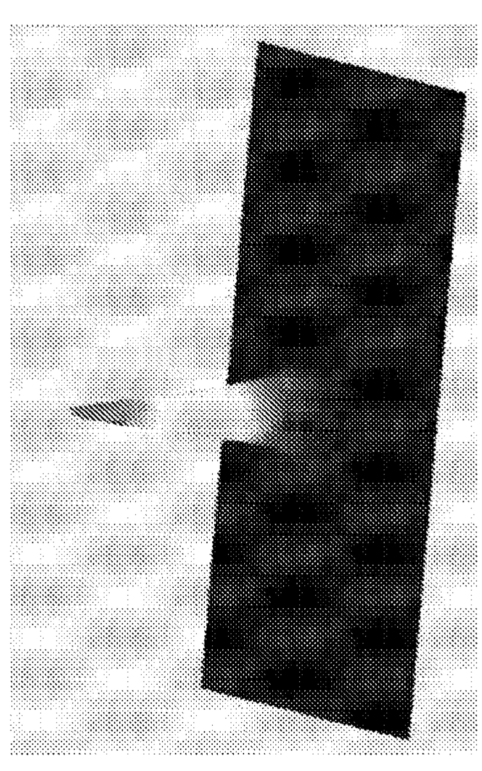
FIGURE 31C

FIGURE 33B
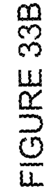
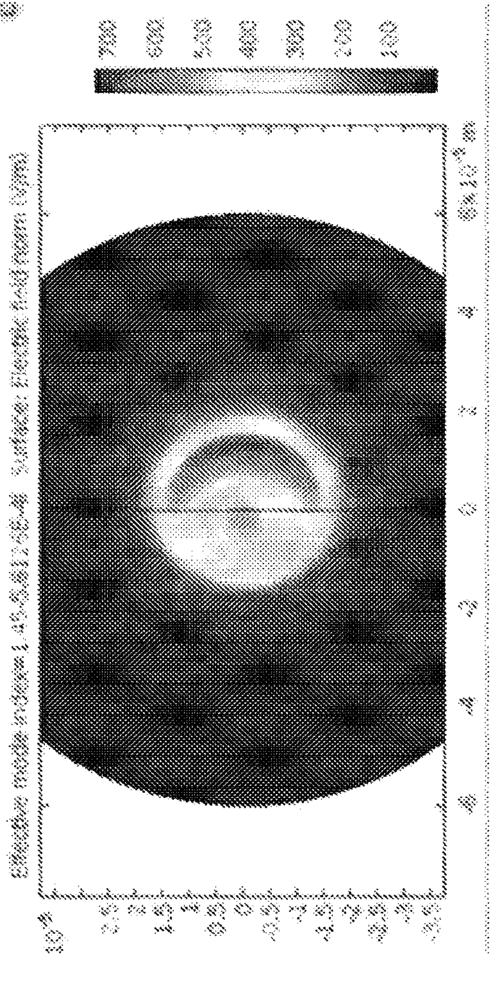
FIGURE 33A

BEAM INTENSITY PROFILE TAILORING WITH A COMPOSITE, TAPERED OPTICAL FIBRE

FIELD OF THE INVENTION

The present invention relates to tailoring the intensity profiles and cross-sectional shapes of laser beams for numerous applications requiring a customized intensity profile. The invention may also relate to splitting laser beams.

DISCUSSION OF THE PRIOR ART

Any discussion of the prior art throughout the specification should in no way be considered as an admission that such prior art is widely known or forms part of common general knowledge in the field.

Fibre lasers are very useful due to their good-beam quality, heat handling, low maintenance and operational cost, small footprint, high wall-plug efficiency, power scaling and all fiberized operation. Fibre lasers outputting approximately Gaussian beams with powers of approximately mW to kW are in use for several applications. Application areas include material processing, aerospace, defence, clinical diagnosis and surgery, space communication, oil and gas sensing as well as imaging. However, the non-uniform intensity profile of the Gaussian laser beam may provide non-uniform heating of the target material, leading to temperature gradients producing non-uniform stress generation in a material. Accordingly, Gaussian beam outputs typically require further manipulation for applications requiring uniform intensity profiles or other customised intensity profiles. Furthermore, within fibre lasers the non-uniform intensity profile of the Gaussian beam may limit the extraction of energy from the gain medium of the laser cavity.

Different beam shapes such as flat-top Gaussian, flat-top square, inverse-Gaussian, annular, elliptical-Gaussian, multi-spots, and polygonal shaped beams are of great importance for several industrial and research applications such as material processing (micromachining, patterning, marking, drilling, welding, brazing, soldering), biomedical (diagnostic and surgery), confocal microscopy, fluorescence microscopy, semiconductor lithography, micro-electronics ablation, laser printing, optical tweezers, coupling solid-state lasers to optical fibres, optical data storage, isotope separation, optical metrology, laboratory experiments, and astronomical applications, for example.

The current non-fibre based state-of-the-art solutions for Gaussian laser beam shaping include the following techniques such as mechanical apertures, lenses, combination of lenses and prisms, spatial light modulators, and diffractive optical elements (DOEs) such as phase plates etc. Mechanical apertures can produce different beams such as annular, elliptical, and flat-top but with poor efficiency as apertures block a significant amount of the light. Discrete optical components such as an axicon lens in combination with an aspherical lens can produce annular and Bessel beams. An aspherical lens-based telescope using refractive field mapping is commercially available for Gaussian to flat-top beam conversion. Spatial light modulators are capable of producing a variety of beam shapes but they suffer from low damage threshold which may make them unsuitable in high power applications.

DOEs such as phase plates can also generate different beam shapes and may have a higher damage threshold than spatial light modulators. There are several problems with these optical systems such as poor conversion efficiency, low damage threshold and additional non-linear effects in the materials used for the optical elements.

Hybrid fibre-based beam-conversion approaches include interfacing of apertures, gratings, axicons, lenses, DOEs, and surface plasmonic structures either at the fibre tip or within a fibre. The splicing of a step-index single mode fibre with a hollow-core M-type/ring fibre has been demonstrated for adiabatic conversion of a Gaussian to an annular beam. Many of these techniques are expensive and again are not suitable for high power applications due to the non-linearity or damage threshold of the optical elements used.

None of these prior art solutions provides beam intensity profile tailoring in a single fibre, particularly for converting Gaussian laser beams to non-Gaussian intensity profiles for single modes at higher powers. Nor to maintaining good beam quality, adiabatic conversion (lossless power) and power scaling in a single, compact and stable device format for single mode applications.

SUMMARY OF THE INVENTION

The present invention aims to provide an alternative apparatus and method which overcomes or ameliorates the disadvantages of the prior art, or at least provides a useful choice.

The present invention provides a composite optical waveguide comprising: at least one primary waveguide; a secondary waveguide surrounding or within the at least one primary waveguide; tapering the composite optical waveguide towards an end; wherein the tapering of the composite waveguide causes a substantial transfer of the optical fundamental mode from one waveguide to another.

The composite optical waveguide wherein the tapering of the optical waveguide is slow and steady, so that the composite waveguide fulfils a length-scale and a weak-power criterion to avoid a coupling between the fundamental mode and higher-order modes. The tapering includes at least one of a reduction in: a diameter of the composite waveguide, a diameter or a thickness of the primary waveguide and a diameter or a thickness of the secondary waveguide. The tapering is substantially adiabatic with respect to the propagation of the optical mode.

The composite optical waveguide further including at least one further secondary waveguide surrounded by or within the at least one primary waveguide. A refractive index profile between the at least one primary waveguide and the at least one secondary waveguide is at least one of a step-index and a graded-index. A refractive index of the at least one primary waveguide is less than a refractive index of the secondary waveguide.

The tapered composite optical waveguide is reciprocal with respect to an input end and an output end. A minimum refractive index difference (DN−Dn) is maintained between the primary waveguide and the secondary waveguide, so that secondary waveguide is an effective waveguide for at least one of a fixed secondary end or a taper length.

A composite optical waveguide as described herein, wherein a beam intensity profile of the output optical mode is modified. A composite optical waveguide wherein at least two secondary waveguides are within a primary waveguide; whereby a single beam at the primary end is split into at least two corresponding beams outputted from a secondary end.

The present invention also provides a composite, optical fibre comprising of: at least one primary waveguide, at least one secondary waveguide, and the at least one secondary waveguide surrounds or is within the primary waveguide;

wherein the composite optical fibre has a uniformly increasing diameter from one end to another.

The longitudinal axes of the at least one primary waveguide and the secondary waveguide are parallel. In some embodiments, the longitudinal axes of the at least one primary waveguide and the secondary waveguide may be coaxial.

The at least one primary waveguide has a transverse cross-sectional shape that is at least one of circular, elliptical and annular. The at least one secondary waveguide has a transverse cross-sectional shape that is at least one of elliptical, circular and annular.

The present invention further provides a method of modifying a beam intensity profile of a laser beam by the steps of: providing at least one secondary waveguide within or surrounded by at least one primary waveguide; and tapering both the primary waveguide and the secondary waveguide together such that a laser beam mode is caused to be transferred from one waveguide to the other along the tapered section; whereby a beam intensity profile of an input laser beam is modified.

Further forms of the invention are as set out in the appended claims and as apparent from the description.

BRIEF DESCRIPTION OF THE DRAWINGS

The description is made with reference to the accompanying drawings, of which:

FIGS. 2 to 4A are a series of colour schematics, as colour intensity two dimensional plots, showing the changing, transverse intensity profiles of the beam as it propagates down the taper from a primary end to the secondary end of the composite optical fibre.

FIGS. 17 to 20 are schematics to further examples of different arrangements of one or more secondary waveguides within a primary step index waveguide.

FIGS. 30 (*b*) to (*d*) are the measured, two-dimensional electric field profiles of the output beams of the drawn, tapered composite fibre.

FIG. 31 (*a*) schematically shows a further experimental set-up of the composite fibre under test spliced to the pig tail fibre of the laser source.

FIGS. 31 (*b*) and (*c*) are schematics of the measured, electric field intensity two-dimensional and three-dimensional respective plots of the output beam after 10 cm from the tapered composite fibre.

FIGS. 33 (*a*) and (*b*) are schematics of the two-dimensional electric field intensity plots respectively for the simulated and the measured output beam profiles at ~1550 nm wavelength.

In the figures the reference numerals are prefixed by the figure number. For example, FIG. 1 is the "100" series, FIG. 2 is the "200" series and so on.

DETAILED DESCRIPTION

Figure 1:
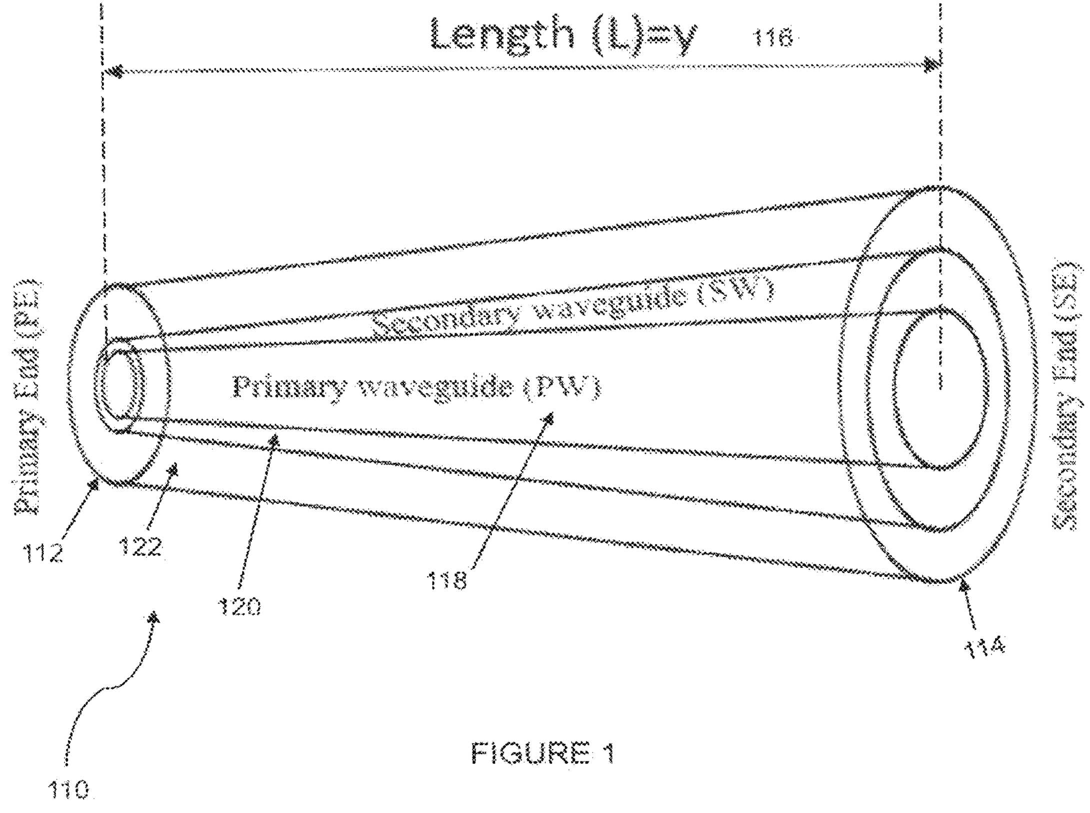
FIG. 1 is a schematic diagram of a tapered, composite optical fibre.

FIG. 1 is a schematic diagram of a tapered composite optical fibre 110. FIG. 1 is not drawn to scale. The composite optical fibre 110 features two ends, one being larger in cross-sectional area than the other. The smaller end is termed a primary end 112. The larger end is termed a secondary end 114. The composite optical fibre 110 has a tapered section 116 of length (L)=y between the primary end 112 and the secondary end 114. The composite optical fibre 110 shown in FIG. 1 has an innermost primary waveguide (PW) core 118. Surrounding the primary waveguide 118 is a secondary waveguide (SW) 120 which may also be termed a ring waveguide. The composite, tapered fibre 110 may be considered as a combination of two waveguides: an inner step-index primary waveguide (PW) and an outermost secondary waveguide (SW). The composite, tapered optical fibre 110 includes a cladding 122 around the secondary waveguide 120 as shown in FIG. 1 and as conventionally used with optical fibres.

The composite all optical-fibre based tapered photonic waveguide 110 may contain a single or multiple secondary waveguides (SW) 120 within or around a primary waveguide (PW) 118. The composite optical fibre may also be termed a beam tailoring optical fibre (BT Fibre) 110 as defined by the inventors. Generally speaking, in use at the larger secondary end 114, both the primary waveguide (PW) 118 and the secondary waveguide/s (SW) 120 may guide modes at a particular wavelength. However, at the same wavelength, adiabatically tapering down the waveguides 118, 120 reduces the dimensions of the secondary waveguide/s 120 such that all the secondary waveguide/s 120 become effectively non-guiding at the smaller primary end 112, whilst the primary waveguide 118 still guides. In other words, the composite optical fibre of FIG. 1 is a spatially modulating optical fibre 110. The composite, tapered optical fibre 110 is described more fully in the following.

FIGS. 2 to 4A are a series of colour schematics, as colour intensity two dimensional plots, showing the changing, transverse intensity profiles of the beam as it propagates down the taper from the primary to secondary end of the composite optical fibre. FIGS. 2 to 4A each, also show line drawing graphs of a refractive index in the vertical direction/axis versus in the horizontal direction/axis a span across a transverse section of the tapered composite optical fibre. FIGS. 2 to 4A are not drawn to scale.

Figure 4B:
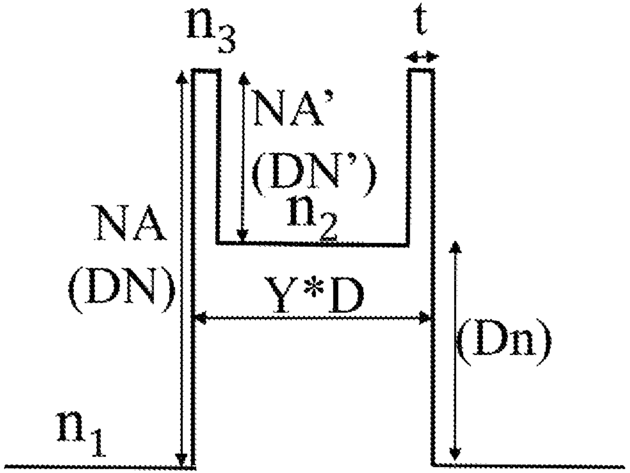
FIG. 4B is a schematic and accompanying equations to the quantities shown in FIGS. 2 to 4A.

FIG. 4B is a schematic and accompanying equations to the quantities shown in FIGS. 2 to 4A. Those quantities are also defined by reference to FIGS. 2 to 4A and also as described herein.

Figures 2, 3, 4A:
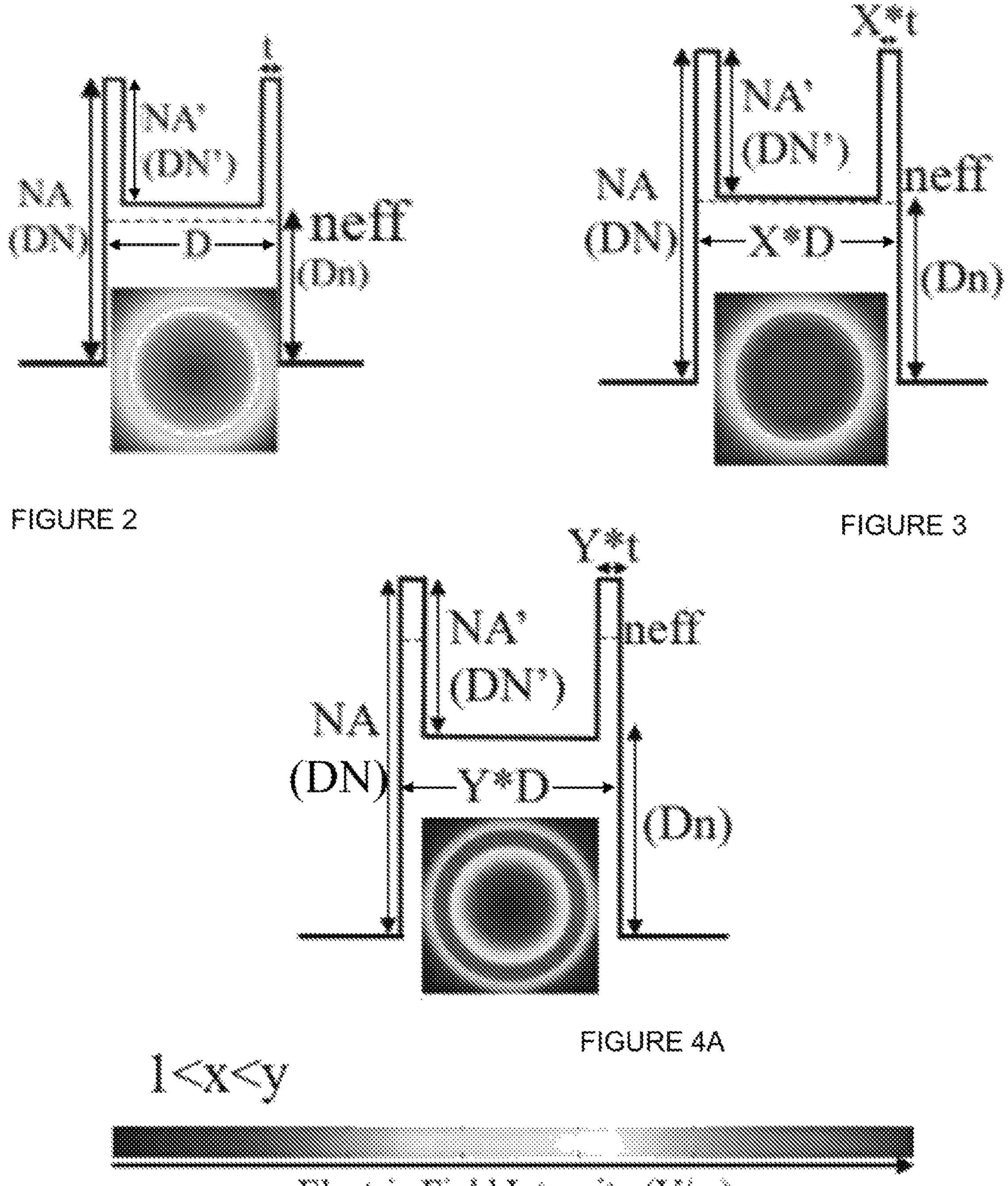

FIG. 2 shows the approximately Gaussian beam intensity profile at the input or primary end (PE)112 of the composite optical fibre 110. FIG. 3 is beam intensity profile partially along the taper section 116 of the composite optical fibre 110 at L=x, where L=y is the total length 116 of the tapered section and $1<x<y$. FIG. 4A corresponds to the beam intensity profile at the output end or secondary end 114 of the tapered section 116. In FIG. 4 the intensity profile at the secondary end 114 is approximately annular.

In FIGS. 2 to 4A the variables used in the line graph representations of refractive index versus span are: "DN" is a refractive index difference between the outermost secondary waveguide 120 and the cladding 122, "DN'" is a refractive index difference between the secondary waveguide 120 and the innermost, primary waveguide 118. "Dn" is a refractive index difference of the step-index of the innermost primary waveguide 118 and the cladding 122, "D" is a core diameter of the secondary waveguide 120 including the primary waveguide 118, "t" is a thickness of the secondary waveguide 120 and neff is the effective refractive index of the fundamental mode propagating in the fibre. FIGS. 2 to 4A also shows the increasing neff with respect to the increasing outer diameter of the fibre.

The results shown in FIGS. 2 to 4A are to an optical fibre having a refractive-index-profile (RIP) resembling a letter "M", known as an M-type fibre. The M-type fibre has been tapered by the inventors to demonstrate one example of a type of BT fibre 110 of the invention. As shown in FIGS. 2 to 4A, at the larger diameter, output secondary end (SE) 114 the thickness of the secondary waveguide 120 is sufficient to guide a mode, whilst at the smaller diameter, input primary end (PE) 112 the diameter of the outer secondary-waveguide 120 is not sufficient to guide the mode. The inventors have noted that the secondary waveguide (or ring-waveguide in this arrangement) surrounding the primary waveguide 118 can guide the mode at the secondary end (SE). That is, the optical mode propagated is spatially shifted from the innermost primary waveguide 118 to the outermost secondary waveguide 120. The optical mode evolves over the length of the tapered fibre in the following fashion. At the input end or primary end 112 a Gaussian like fundamental mode (FM) exists in the step-index region (or primary waveguide) as shown in FIG. 2. The effective refractive index (neff) of the fundamental mode is lower than the refractive index of the primary waveguide (PW). Along the length of the tapered section 116 the mode first slowly shifts to the interface region of the step-index between the primary and secondary waveguides to become a flat-top beam as shown in FIG. 3. The neff of the fundamental mode equals the refractive index of the primary waveguide (PW). Propagating further along the increasing outer diameter of fibre to the output secondary end 114 the mode shifts solely to the secondary waveguide 120 to become an annular beam in the secondary waveguide at the output secondary end of the composite optical fibre 110. Now, the neff of the fundamental mode is higher than the refractive index of the primary waveguide (PW) but lower than the refractive index of the secondary waveguide (SW). The smaller, input primary end corresponds to the minimum dimension of the tapered composite optical fibre. The neff of the fundamental mode increases with increasing diameter of the fibre.

A slow tapering of the composite optical fibre may ensure lossless (adiabatic) transition of the mode to the converted intensity profile. The taper length considerations are described below with respect to FIGS. 5 to 7.

Figure 5:
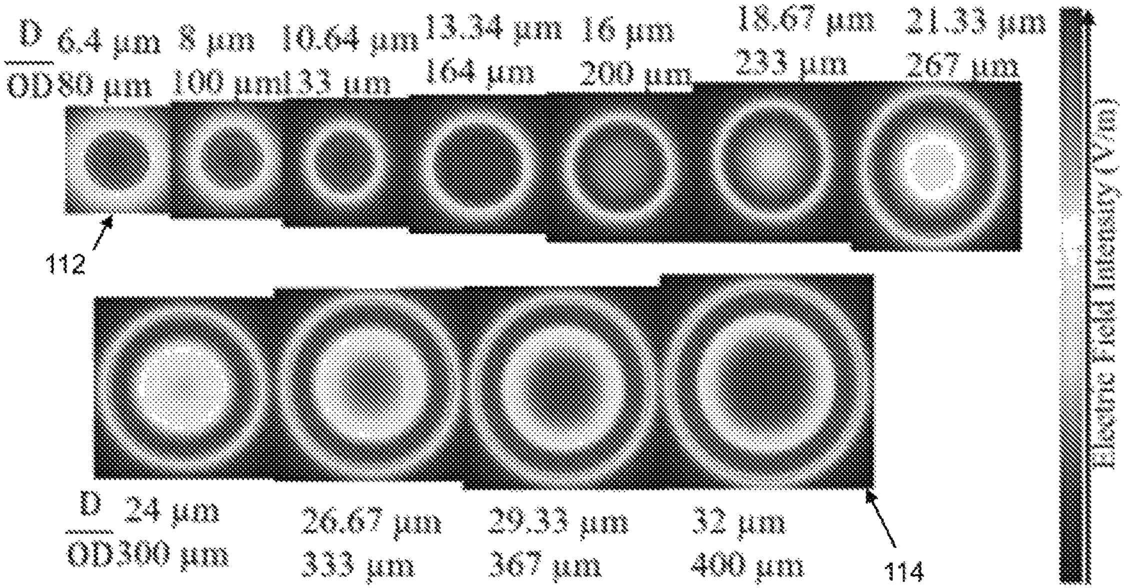
FIG. 5 shows a series of two-dimensional electric field intensity profiles of the fundamental modes from the smaller, primary end to the larger, secondary end of the composite optical fibre.
Figure 6:
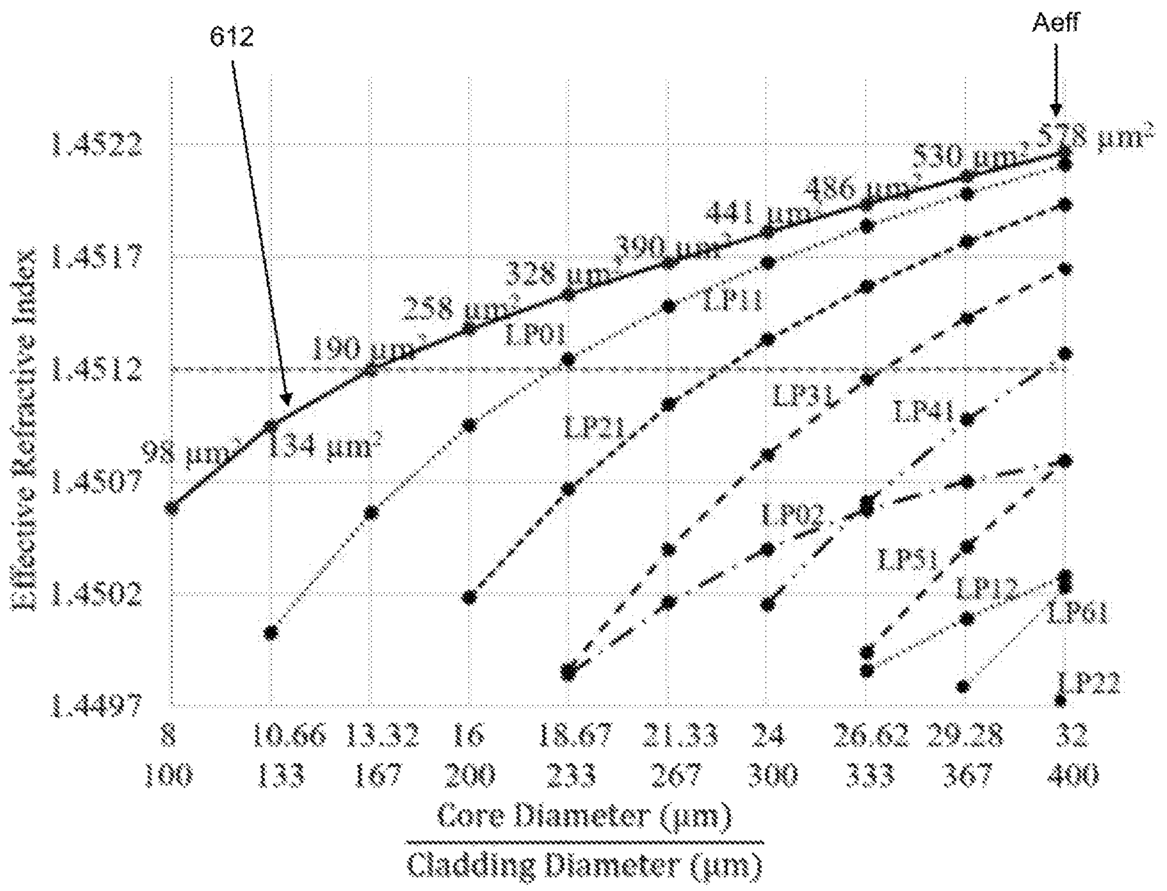
FIG. 6 is a graph schematic showing the calculated effective refractive indices (neff) of all possible modes versus different core/outer diameters for a M-type BT fibre of the composite optical fibre of FIG. 5.
Figures 7A, 7B, 7C, 7D:
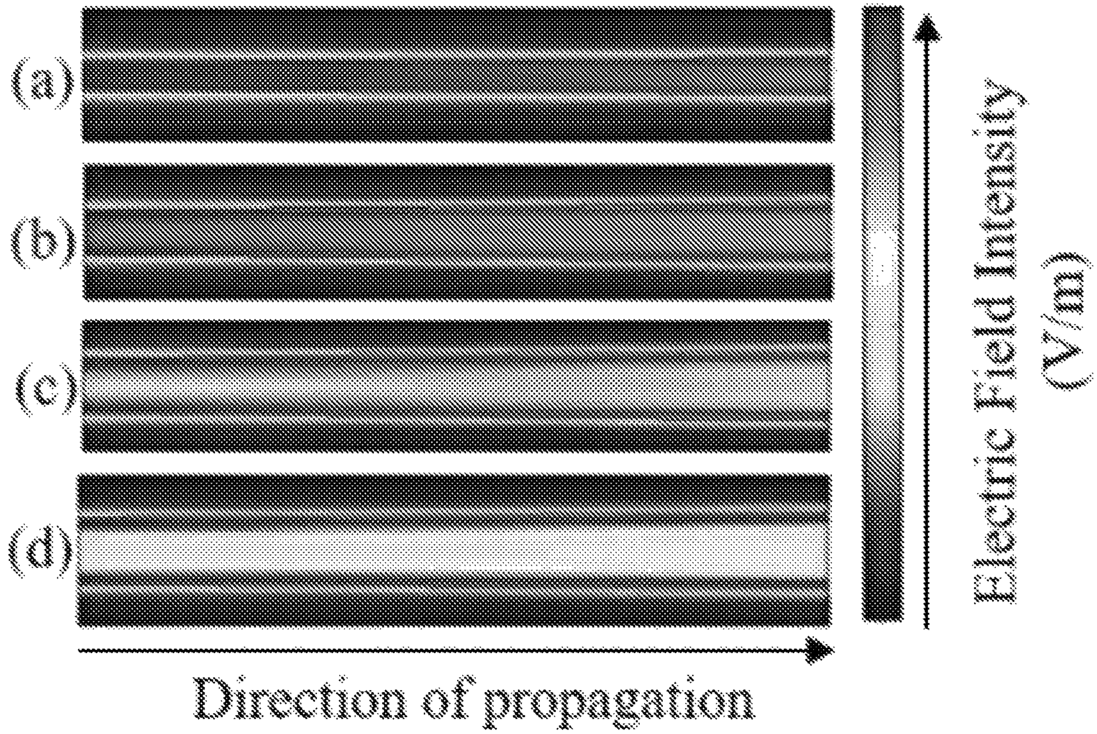
FIGS. 7(*a*) to (*d*) are a series of four schematic diagrams of longitudinal section intensity plots of 200 μm lengths of the composite optical fibre of FIGS. 5 and 6.

FIGS. 5 to 7 are to results from numerical simulations to a second composite optical fibre 110 that have been performed by the inventors using commercially available Finite Element Method (FEM) based COMSOL Multiphysics 5.3 software. The wavelength of operation in the simulation is 1.06 μm unless stated otherwise. The fibre parameters at the larger, secondary end (SE) are: DN (refractive index difference between the ring and the cladding)=0.004, Dn (refractive index difference between the step-index and the cladding)=0.0015, D (core diameter)=32 μm, t (ring thickness of PW)=4 μm and an OD (cladding diameter)=400 μm. After being tapered down to 80 μm OD at the smaller primary end (PE) the other transverse dimensions of the fibre are reduced to D=6.4 μm and t=0.8 μm.

FIG. 5 shows a series of two-dimensional electric field intensity profiles of the fundamental modes from the smaller, primary end (PE) to the larger, secondary end (SE) of the composite optical fibre. The laser beam has been inputted at the smaller, primary end (PE). Accompanying each intensity profile plot is the core diameter D and cladding diameter OD at that length position along the tapered composite optical fibre.

At the smaller, input primary end (PE) there is only one possible mode solution which is a Gaussian-like fundamental mode (FM) as shown in the upper left intensity plot of the series of FIG. 5. Progressing from the primary end to the larger, output secondary end (SE), the dimensions of the composite waveguide increase, as does the effective index (neff) of the fundamental mode. Consequently, the electric field intensity distribution of the propagating optical mode from the primary end slowly shifts from Gaussian-like to a flat-top then to an annular profile in the outermost primary waveguide. The annular intensity profile for the output at the secondary end is shown in the lower right intensity plot of FIG. 5.

FIG. 6 is a graph schematic showing the calculated effective refractive indices (neff) of all possible modes versus different core/outer diameters for a M-type BT fibre of the composite optical fibre of FIG. 5. The effective area (Aeff) values of the fundamental mode are shown for selected values of the $LP_{01}$ mode, shown as the uppermost solid line 612. FIG. 6 shows that increasing the dimensions of the composite waveguide also provides several possible mode solutions. A modal parameter $M_{SW/CW}$ is defined here as the: number of possible mode solutions in the secondary waveguide SW divided by the total number of possible mode solutions in the complete composite waveguide SW+PW. The modal parameter $M_{SW/CW}$ is 0/1 at the smaller primary end PE and 5/12 at the larger secondary end SE.

In order that the transition in beam intensity profile is adiabatic or lossless as the beam propagates along the taper of the composite optical fibre it is necessary to satisfy a "length-scale" and "weak-power" criterion to ensure a smooth transition for the fundamental mode without exciting the higher order modes (HOMs) and incurring significant losses via those HOMs. In order to achieve this the tapering length of the composite optical fibre needs to be much greater than the beat length between the fundamental mode (FM) and closest HOM. FIG. 6 shows that the difference in effective index (neff) between modes decreases with increasing dimensions of the composite waveguide and is worst at the larger secondary end (SE).

For the example of FIGS. 5 and 6 for a taper from a cladding diameter (OD) from 80 μm to 400 μm, at a wavelength λ=1.06 μm, the beat length between the fundamental mode (FM) LP01 and the LP11 mode is ~1.8 cm. Accordingly, a taper length of larger than 50 cm is more than sufficient to ensure an adiabatic transition of the FM, LP01. Whilst a small tapering length may be an important requirement for couplers and multiplexers in order to keep a device size small, there is typically no such constraint for beam tailoring applications.

FIGS. 7(*a*) to (*d*) are a series of four schematic diagrams of longitudinal section intensity plots of 200 μm lengths of the composite optical fibre of FIGS. 5 and 6. The calculated beam propagation model of the fundamental mode over 200 μm lengths of the composite optical fibre of FIG. 5 shown for FIGS. 7(*a*) to (*d*) were for the core diameters (D) increases over the tapered sections of (a) 8 to 10 μm, (b) 12 to 16 μm, (c) 15 to 18.75 μm, and (d) 18 to 21 μm for the M-type BT fibre. The longitudinal intensity plots were not highly accurate simulations but were sufficient to demonstrate a "proof-of-concept" that a nearly-Gaussian mode shifts to flat-top, then to an inverse-Gaussian profile and finally to annular profile over the length of the fibre as the effective refractive index (neff) of the propagating fundamental mode increases. An approximation made to the simulations was to use 2D simulations instead of 3D simulations to allow for a practical computation in a reasonable time. In addition, a longer distance of propagation (much larger than ~7 mm for 1 μm change in core diameter as per the "length-scale" criterion) is required to observe an accurate adiabatic conversion of the mode, again this was approximated consistent with demonstrating "proof of concept".

The composite optical fibre or BT fibre as described herein are bi-directional (reciprocal and the transformation can be reversed), may also provide a conversion from an annular or top-hat beam intensity profiles to a Gaussian intensity profile.

Figure 8:
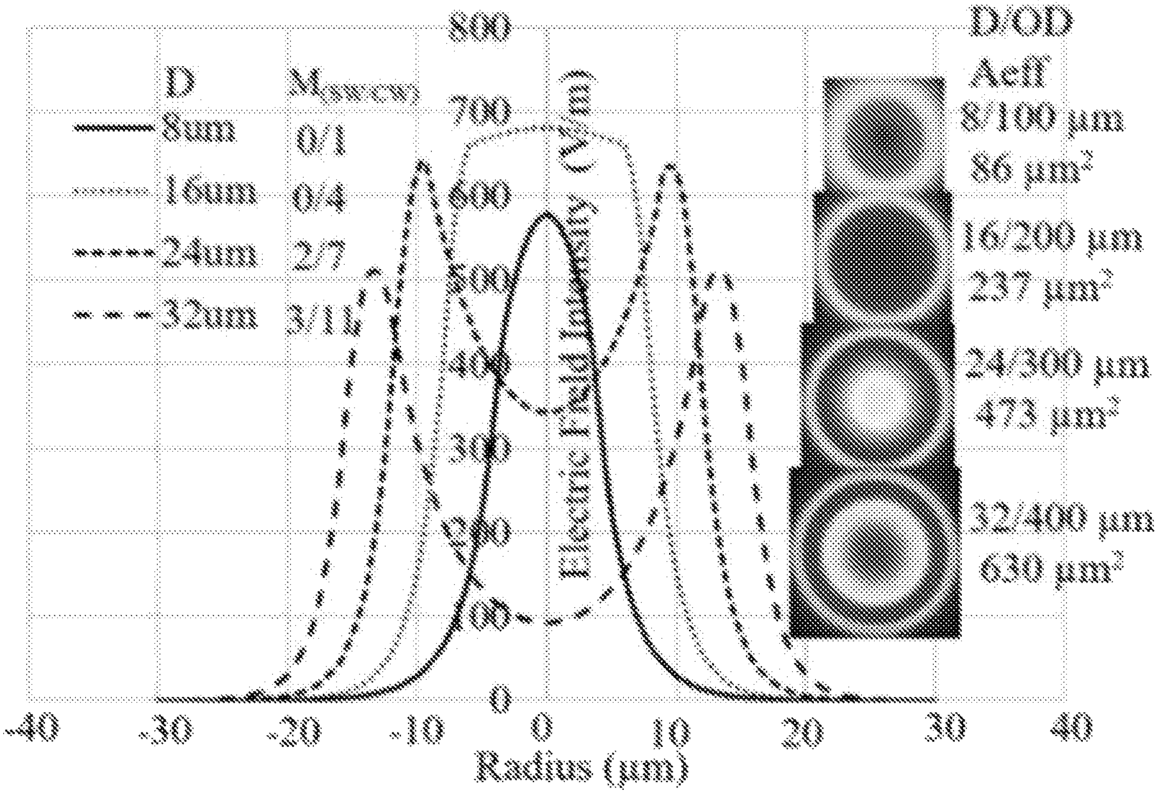
FIGS. 8 and 9 are electric field intensity plots of the fundamental modes for different Dn (refractive index difference between the step-index and the cladding) of a M-type tapered composite optical fibre of the invention for a range of core diameters (D).
Figure 9:
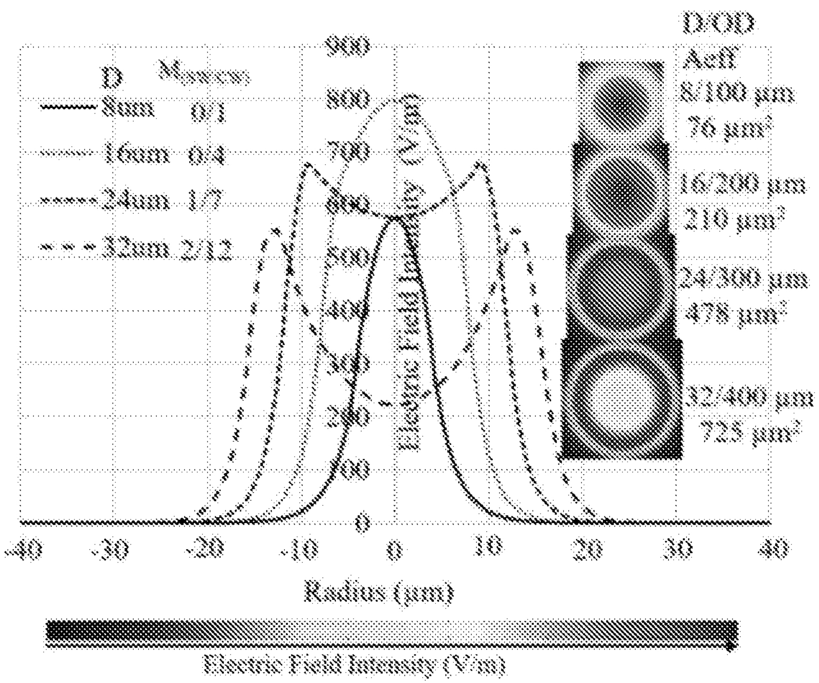

In order to further perform the invention of a tapered composite optical fibre it is necessary to understand the influence of various other parameters such as Dn (refractive index difference between the step-index and the cladding), FIGS. 8 and 9; DN (refractive index difference between the primary waveguide and the cladding) FIGS. 10 to 12; and t (primary waveguide thickness), FIGS. 13 and 14.

FIGS. 8 and 9 are electric field intensity plots of the fundamental modes for different Dn (refractive index difference between the step-index and the cladding) of a M-type tapered composite optical fibre (BT) for a range of core diameters (D). FIG. 8 is to a Dn of 0.002 and FIG. 9 is to a Dn of 0.0025. Each FIGURE has a line graph of electric field intensity versus core radius as well as corresponding two-dimensional colour intensity plots to the right of the respective line graph. Also provided are the effective area of the FM (Aeff), and the modal parameter $M_{SW/CW}$. Common parameters to FIGS. 8 and 9 are: D=8 μm, t=1 μm, DN=0.004, OD=100 μm at the primary end (PE), OD=400 μm at the secondary end (SE) and the same composite fibre length.

The electric field intensity profile differs between the tapered composite fibres of FIGS. 8 and 9 but it is possible to achieve a particular intensity profile at different ODs. A comparison with FIGS. 5, 6, 8 and 9 provides three examples of M-type tapered composite fibres (BT) where only Dn differs, all other parameters are the same. The fibre with smallest Dn transitions to the flat-top profile first. Lowering the Dn for a fixed DN reduces the primary waveguide to secondary waveguide interface (PW-SW) refractive index level with respect to the cladding. The lower Dn also results in less guided modes: in this case 2, 4, and >4 for Dn=0.0015, 0.002, and 0.0025 respectively for the flat-top intensity profile. A lower Dn also leads to strong guidance for the secondary waveguide (SW) as DN is fixed. This is evident from the mode intensity profile for all three cases at 32 μm core diameter, for the lowest Dn the on-axis intensity is very low. Thus, selecting a smaller Dn advantageously allows a smaller tapering length of the composite optical fibre to be used for a desired flat-top or annular mode profile and fewer possible guided modes. However, a higher Dn allows a tight guidance to the fundamental mode (FM) at the primary end (PE) that is closest to a Gaussian profile. A lower Dn leads to poor guidance with a flatter mode profile that may not match properly with the incoming Gaussian signal/beam. Therefore, a higher Dn (while DN is fixed) can be compensated by a longer tapering length of fibre in order to achieve a particular mode profile with satisfactory guidance. It will be readily appreciated from the teachings herein that a person skilled in the art may calculate and select an optimum value of the Dn depending on an application's requirements and other constraints.

Figure 10:
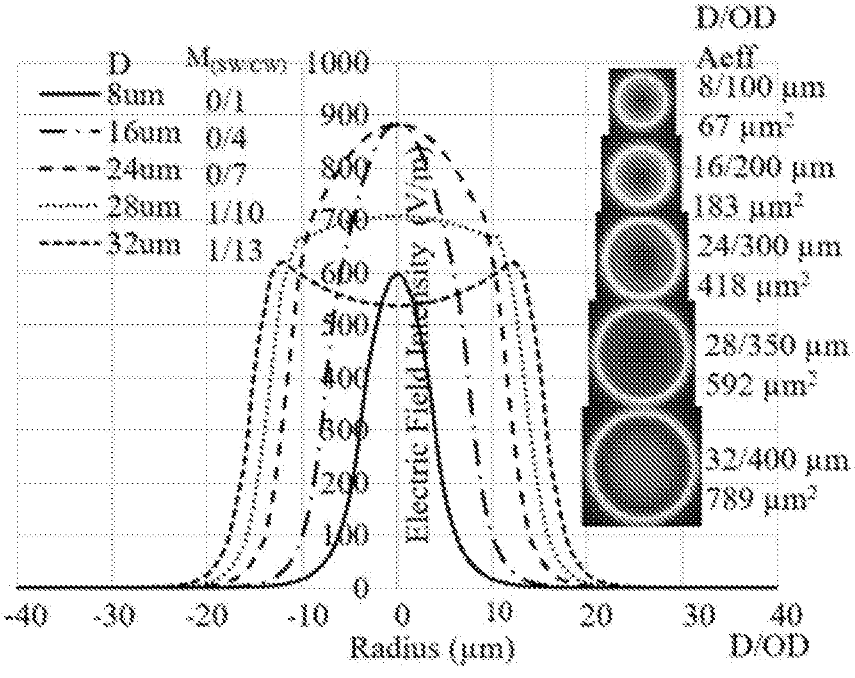
FIGS. 10 to 12 are electric field intensity plots of the fundamental modes for different DN (refractive index difference between the primary waveguide and the cladding) of a M-type tapered composite optical fibre (BT) for a range of core diameters (D).
Figures 11, 12:
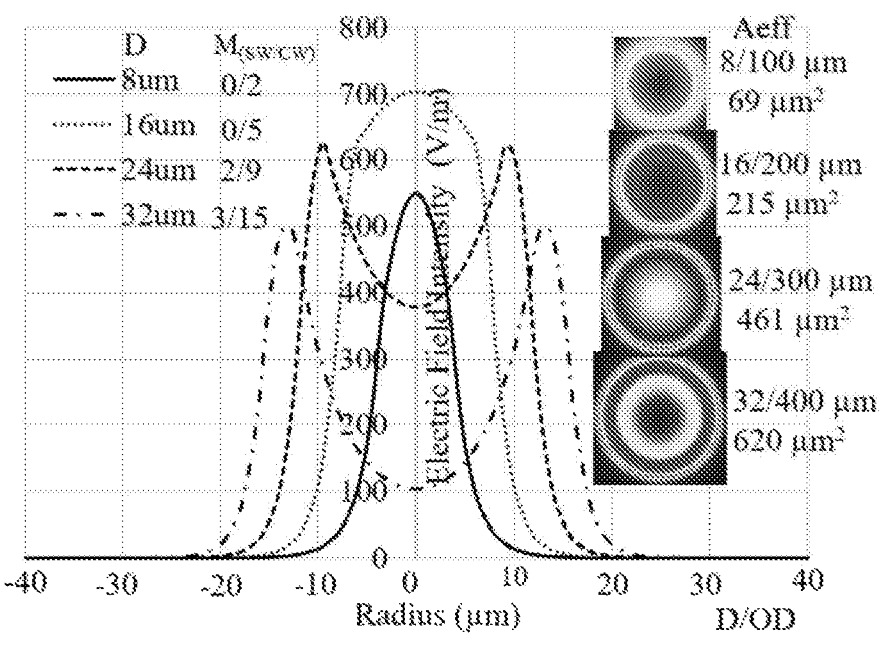

FIGS. 10 to 12 are electric field intensity plots of the fundamental modes for different DN (refractive index difference between the primary waveguide and the cladding) of a M-type tapered composite optical fibre (BT) for a range of core diameters (D). FIG. 10 is to a DN of 0.004, FIG. 11 is to a DN of 0.005 and FIG. 12 is to a DN of 0.006. Each FIGURE has a graph of electric field intensity versus core radius as well as a corresponding two-dimensional colour intensity plots as a respective inset. Also provided are the effective area of the FM (Aeff), and the modal parameter $M_{SW/CW}$. Common parameters to FIGS. 10 to 12 are: D=8 μm, t=1 μm, Dn=0.003, OD=100 μm at the primary end (PE), OD=400 μm at the secondary end (SE) and the same composite fibre length.

A comparison of FIGS. 10 to 12 shows that a higher DN supports more possible modes. For the lowest DN=0.004 of FIG. 10, the mode does not transition to the annular profile at the (SE) for the available taper length because of the low refractive index difference between the primary waveguide (PW) and secondary waveguide (SW), that is DN−Dn=0.001. Attaining an annular intensity profile would require a larger outer diameter at the SE, entailing a longer tapering length to achieve it. For DN=0.005 of FIG. 11 the mode attains an annular profile at the secondary end (SE) but with more guided modes. For the highest DN=0.006 of FIG. 12, the mode has an annular profile with comparatively no intensity at the centre but again with a higher number of possible guided modes.

The inventors have consequently noted that it is necessary to maintain a minimum refractive index difference (DN−Dn) between the secondary waveguide (SW) and the primary waveguide (PW), so that secondary waveguide (SW) is an effective waveguide for a fixed secondary end SE or a particular taper length. The inventors have also noted that there is a trade-off between the refractive index of the secondary waveguide (SW) with respect to the primary waveguide (PW) and the minimum OD at the secondary end (SE) for a proper transition of the propagating optical mode to the secondary waveguide (SW). Furthermore, it should also be considered that a higher refractive index of the secondary waveguide (SW) has the disadvantage of a larger number of possible guided modes. It will be readily appreciated from the teachings herein that a person skilled in the art may therefore calculate and select an optimum value of the refractive index of the secondary waveguide (SW) to obtain the desired mode intensity profile at the secondary end (SE).

Figure 13:
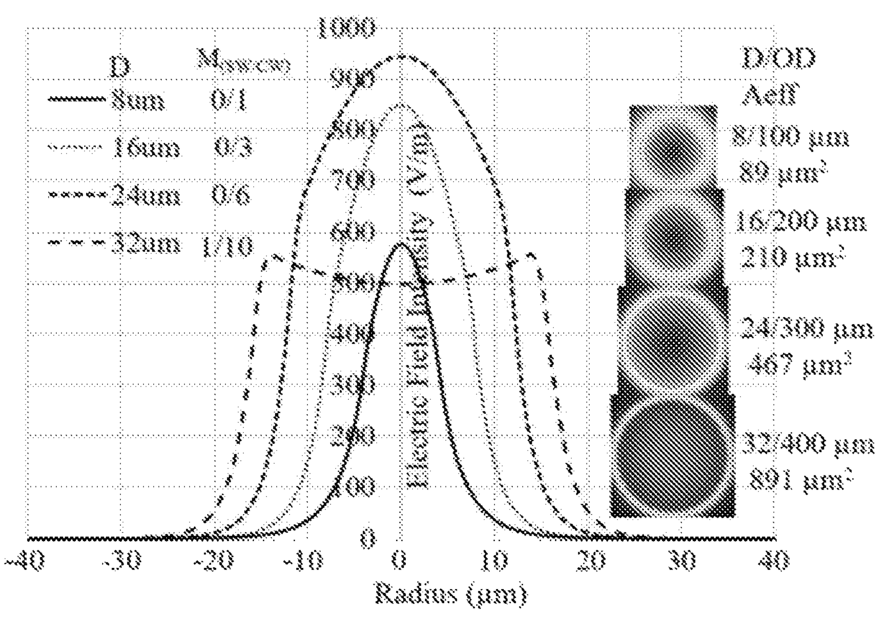
FIGS. 13 and 14 are electric field intensity plots of the fundamental modes for different ring thickness (t) of the M-type tapered composite optical fibre (BT) for a range of core diameters (D).
Figure 14:
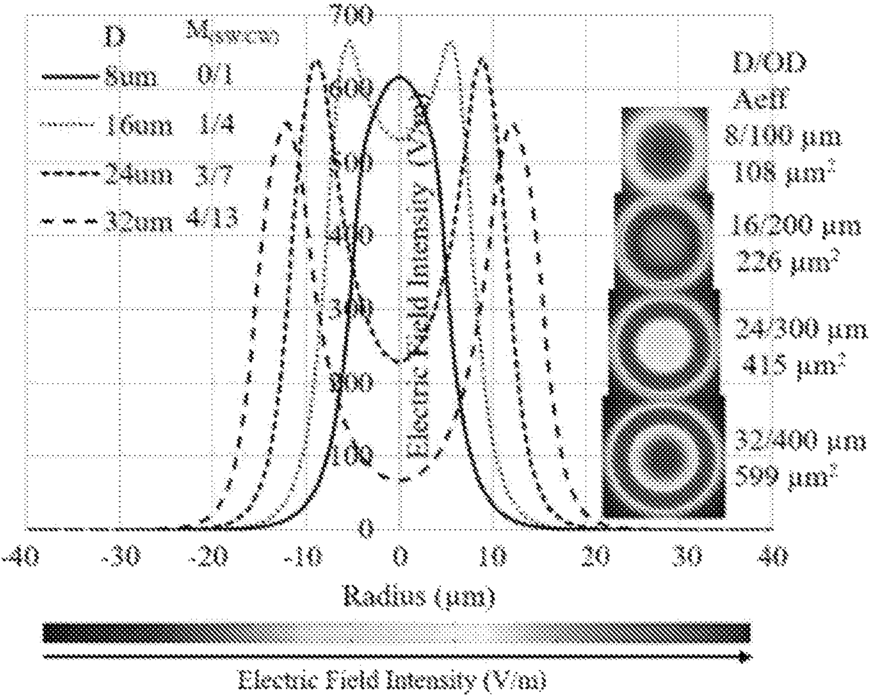

FIGS. 13 and 14 are electric field intensity plots of the fundamental modes for different ring thickness (t) of the M-type tapered composite optical fibre (BT) for a range of core diameters (D). FIG. 13 is to a thickness of 0.5 μm and FIG. 14 is to a thickness of 1.5 μm. Each FIGURE has a line graph of electric field intensity versus core radius as well as a corresponding two-dimensional colour intensity plot as a respective inset. Also provided are the effective area of the FM (Aeff), and the modal parameter $M_{SW/CW}$. Common parameters to FIGS. 13 and 14 are: D=8 μm, Dn=0.002, DN=0.004 and OD=100 μm at the primary end (PE) with an OD=400 at the secondary end (SE) for the same composite fibre length.

For t=0.5 μm of FIG. 13, the secondary waveguide (SW) poorly supports the input fundamental mode at the primary end (PE). At the output secondary end (SE) the beam has only transitioned to a flat-top intensity profile for this taper length example. In contrast, for t=1.5 μm, the fundamental mode at the primary end (PE) is slightly flattened, then as the optical mode propagates in the tapered composite fibre the mode is transformed to an annular intensity profile in the secondary waveguide at the secondary end (SE) as shown in FIG. 14. The larger thickness (t) of the secondary waveguide (SW) leads to greater number of total modes at the secondary end (SE): 13 total modes (t=1.5 μm, FIG. 14) versus 10 total modes (t=0.5 μm, FIG. 13.

The inventors have identified the following principles that are reflected in the teachings provided herein. The secondary waveguide (SW) at the primary end (PE) may have optimised parameters so that at the desired OD (cladding diameter) of the secondary end (SE), the secondary waveguide is effective enough to support the fundamental mode (FM). The optimised parameters include the transverse and longitudinal dimensions (volumetric parameters) as well as material properties such as absolute and relative values of the refractive indexes of the tapered, composite fibre. If the parameters of the secondary waveguide (SW) are too small (e.g. less than optimal) at the primary end (PE), then a relatively long tapering length may be necessary to attain the desired intensity profile at the secondary end (SE). In contrast, if the parameters are too large (e.g. more than optimal) for the secondary waveguide (SW) at the input primary end (PE), then the fundamental mode (FM) of the primary waveguide (SW) may depart from the Gaussian profile which may lead to a high splicing loss between the seeding/source laser or optical mode source and the input of the tapered composite fibre (BT).

Similarly, the primary waveguide may have optimised parameters with respect to the dimensions and refractive indices of the tapered composite optical fibre, particularly at the primary end (PE). For example, at the primary end (PE), the thickness of the primary waveguide is small enough to be single-mode, whilst large enough to support a nearly Gaussian profile for the fundamental mode (FM).

A further definition of the secondary waveguide is: the parameters of diameter or thickness and refractive index, with respect to the primary waveguide, of the secondary waveguide are small enough at the primary end so that the optical mode resides in the primary waveguide only. In addition, the secondary waveguide may be located inside and/or around the primary waveguide, we refer to the following FIGS. 15 and 17 to 21 as well as throughout the specification.

The inventors have also noted the invention described herein is not just applicable to an M-type fibre but any fibre having two or more cores/waveguides, which on longitudinal variation of fibre diameter, allows the coupling of the fundamental mode from one core/waveguide to another.

It will be readily appreciated that a refractive index profile between the primary waveguide/s and the secondary waveguide/s may also be a graded-index profile.

The invention as described herein may have further advantages to high power applications due to its large mode area operation and structure.

The tapered composite optical fibre (BT) described herein may be fabricated using conventional modified chemical vapor deposition process and fibre drawing techniques. Diameter tapering may be applied during the fibre drawing by a modest modification to the drawing process in order to convert un-tapered M-type fibres to a tapered, composite M-type fibre (BT). That is, fabrication includes providing at least one secondary waveguide within or surrounding the primary waveguide then tapering the primary and secondary waveguides together such that in use a laser beam mode is caused to be transferred from one waveguide to the other waveguide along the tapered section. Further fabrication techniques are described with respect to FIG. 21.

The tapered, composite optical fibre may also be further modified in manufacture so that it may operate in an active or amplifier configuration. For example, by appropriately doping or otherwise modifying the secondary and/or primary waveguides.

In one example doping with rare-earth (RE) ions of Yb, Er, Tm and/or Ho and other co-dopants such as $Al_2O_3$, $P_2O_5$, and as suitably selected by a person skilled in the art may be used to provide a non-Gaussian beam laser/amplifier. The pigtail fibre of a low power seed laser diode may be spliced to the primary end (PE) of an M-type tapered composite optical fibre. Then the tapered length of the composite optical fibre used to adiabatically convert the Gaussian beam from the pigtail fibre to the annular beam at the secondary end (SE).

Assuming the secondary waveguide of the tapered, composite optical fibre is doped with RE ions, then amplification of the signal will also take place, after the conversion of the mode from the primary to secondary waveguide has taken place. The amount of gain will depend on the overlap integral of the mode profile with the RE ion doped area. Though the amplification may take place as soon as the beam enters into the tapered composite optical fibre, amplification will occur more strongly after the conversion into the annular profile in the secondary waveguide has taken place.

For flat-top beams, both the primary waveguide (PW) and secondary waveguide (SW) may be RE-ion doped. For high power applications a long length of fibre having large core diameter may be required in order to avoid non-linear effects. Further amplification may be obtained by using un-tapered composite optical fibre which has been suitably doped. This option enables high-power Non-Gaussian lasers/amplifiers to also be realized.

The principles described to the tapered composite optical fibre have been described above to circular transverse cross-section geometries of one secondary waveguide within a co-axial (longitudinally) primary waveguide. The principles may also be applied to other transverse cross-section shapes as well as to multiple secondary waveguides within or surrounding a singular primary waveguide. Advantageously this provides considerable versatility to output beam intensity profiles that may be produced. In the following with respect to FIGS. 15 to 21, a range of examples are provided to demonstrate the application of the principles described herein to a variety of tapered composite optical fibres that may be used to produce further customised or tailored output beam intensity profiles in a robust fashion.

Figure 15:
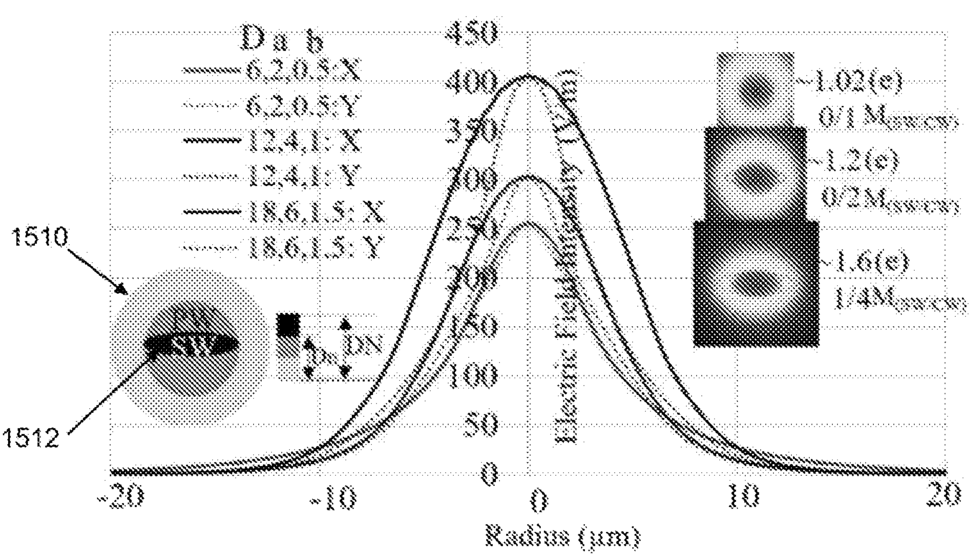
FIGS. 15 and 16 are a first example to an elliptical-circular beam tailoring fibre (EC-BT).
Figure 16:
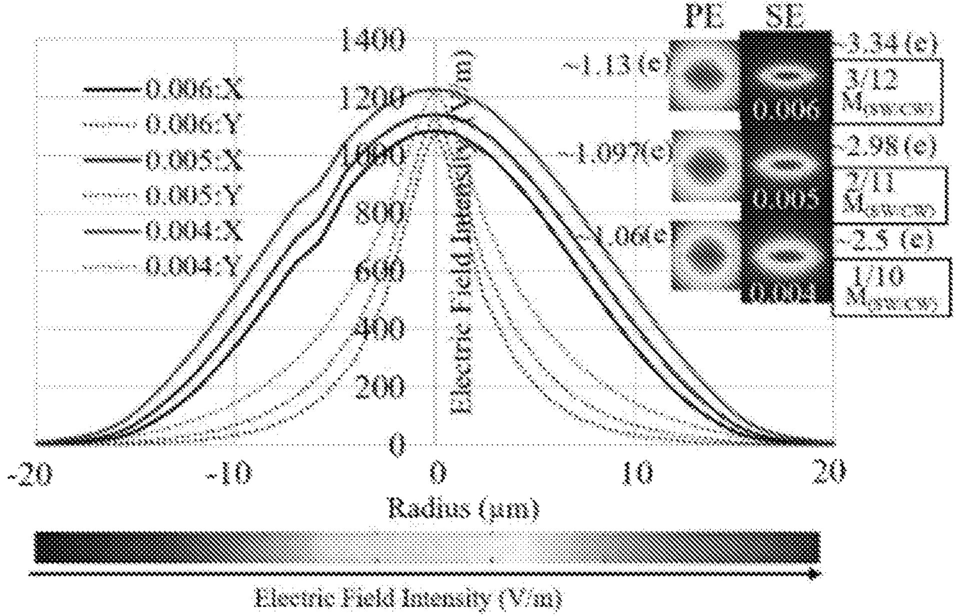

FIGS. 15 and 16 are a first example to an elliptical-circular beam tailoring fibre (EC-BT) 1510 where a secondary waveguide 1512 has an elliptical cross-section within a circular cross-section of a step index primary waveguide, as shown in the inset schematic at the lower left of FIG. 15. As for the previous FIGURES, those of FIGS. 15 and 16 have a line graph and two-dimensional (colour intensity transverse section) intensity plots of the electric field intensity profiles within the elliptical, tapered composite optical fibre 1510. The ellipticity (e) of a Gaussian beam has been defined here as the ratio of full-widths at half-maximum of the electric-field intensities along the two orthogonal axes of the elliptical secondary waveguide.

FIG. 15 shows an Elliptical-Circular BT fibre at three different outer diameters (D) at the input primary end (PE), in multiples of 6 μm (viz. 6, 12 and 18 μm) The fibre parameters at the primary end (PE) are: D=6 μm, a=2 μm (semi-major axis), b=0.5 μm (semi-minor axis), DN=0.004, and Dn=0.0015. The right side insets to the two-dimensional intensity plots also have the value of the ellipticity parameter of the mode and the modal parameter $M_{SW/CW}$. The nearly circular-Gaussian mode (e~1.02) at the input primary end (PE) gains an ellipticity of ~1.6 at the output secondary end (SE or 3*PE that is, 3× the primary end diameter). The arrangement of the elliptical tapered composite fibre is reciprocal, that is the beam transformation may be reversed, converting an elliptical beam to a circular beam. At the output secondary end (SE), the waveguide may guide four possible modes with only one elliptical mode being in secondary waveguide.

FIG. 16 is to three Elliptical-Circular composite fibres that have three different DN (refractive index difference between the secondary elliptical waveguide and the cladding) values of: 0.004, 0.005, and 0.006. The other parameters at the primary end (PE) are: D=9 μm, a=4.5 μm, b=300 nm and Dn=0.0015. At the secondary end (SE): D=30 μm, a=15 μm, b=1 μm, Dn=0.0015 is the same for all three fibres. Inset two-dimensional intensity plots show the value of the ellipticity, e, and the modal parameter $M_{SW/CW}$ at the secondary end for the three elliptical-circular, tapered composite fibres. Nearly circular-Gaussian beams with ellipticities ~1.06, ~1.097 and ~1.13 at the primary end (PE) transform to ellipticities of ~2.5, ~2.98, and ~3.34 at the secondary end (SE) for the three different DN values of 0.004, 0.005, and 0.006 respectively. Increasing the DN value results in a tighter confinement of the mode in the elliptical region, together with the possible offset of a larger number of possible mode solutions for SW and PW.

If the elliptical core of an EC-BT fibre is approximated by the same sized rectangular cross-sectional core such that length=2*a, width=2*b, then the beam profile at the secondary end (SE) may be similar to an EC-BT for most cases. The inventors' have coined the term Rectangular-Circular BT (RC-BT) fibres for such a rectangular cross-section secondary waveguide in a circular cross-section primary waveguide.

These EC-BT composite fibres of the invention may be very useful for converting elliptical-Gaussian beams emitted from laser diodes into circular-Gaussian beams. Semiconductor laser diodes may have highly asymmetrical flat active regions, which may generate highly elliptical (1:2 to 1:4) beams. The coupling efficiencies of these elliptical beam to single-mode fibres may vary from between approximately 20% to 65%, therefore requiring several optical manipulations to improve the coupling efficiency and thus possibly limiting the employment of these laser diodes for several applications. The invention enables the elliptical-Gaussian beam exiting from a laser diode to be launched into the secondary end (SE) of the EC-BT fibre, then over the tapered length of the composite fibre the beam is converted to be circular-Gaussian at the primary end (PE) output. The modal field diameter (MFD) of the converted circular-Gaussian beam may be tailored by choosing the appropriate length of the tapered composite fibre. The invention in this example avoids the use of bulky and lossy optical elements such as lenses, prisms, phase plates, etc. as well as increasing the coupling efficiency into a conventional single mode fibre.

In another non-Gaussian high-power laser application, the elliptical or rectangular region of these EC/RC composite, tapered fibres may be doped with rare-earth (RE) ions for amplification/lasing. Advantageously, the highly-elliptical or high-aspect ratio rectangular core fibre, if coiled along the small axis of the core, does not suffer from bend-induced effective area reduction that may afflict conventional circular core fibre. Accordingly, they may be coiled to provide a compact device format if required.

FIGS. 17 to 20 are schematics to further examples of different arrangements of one or more secondary waveguides within a primary step index waveguide. At the primary end, only the primary waveguide is large enough to guide modes, while the secondary waveguide/s at the primary end are too small to guide modes. FIG. 17 has an inset schematic to a transverse section of an offset step-index secondary waveguide, "OC-BT". FIG. 17 also shows corresponding intensity profile plots for the primary end (PE) and the secondary end (SE). FIGS. 18 and 19 are respectively to twin and multi-core cores, "TC-BT" and "MC-BT", composite and tapered optical fibres. FIG. 20 is to a square and composite core secondary waveguide, "SC-BT", arrangement for a composite, tapered optical fibre. For each of the FIGS. 17 to 20 the 2D electric field intensity profiles are shown at PE, 2*PE, and SE (3*PE or 4*PE) of the tapered length. The fibre parameters at the PE are shown in the FIGURES along with the effective refractive index of the fundamental mode at the PE and SE and the value of the respective modal parameters.

FIG. 17 to the offset secondary waveguide shows a Gaussian mode with neff=~1.4502 at the primary end (PE) that is well confined to the step-index SW at SE=~3*PE with neff=~1.4518. The fibre parameters at the PE are: D=8 μm, diameter of offset secondary waveguide (step-index core), Din=2 μm, the distance between the centres of the primary waveguide (PW) and offset step-index core (pitch)=1 μm, refractive index between the PW and cladding (Dn)=0.0015, and the refractive index between the secondary waveguide (SW) and the cladding (DN)=0.004. At the secondary end (SE), there are five possible mode solutions, however only the fundamental mode (FM) is in the secondary waveguide (SW). The beat length between the FM and the closest HOM is ~0.1 cm at the SE.

Conventionally, it is difficult to couple light into an off-set core fibre using conventional splicing with a standard fibre. The OC-BT can address this problem by enabling the easier launching of the light into the off-set core. The output of the OC-BT fibre can be spliced to a fibre having an off-set core. This way good coupling efficiency can be achieved. An application area being the use of an offset core to break the circular symmetry in a double clad configuration required for many fibre laser applications. The circular symmetry in the double clad configuration can give rise to helical modes which do not pass through the core; therefore, it leads to poor cladding pump efficiency for fibre lasers. The use of the OC-BT fibre can rectify this issue.

FIG. 18 to the twin core secondary waveguide shows a nearly Gaussian mode with neff=~1.4504 at the primary end (PE) which by the secondary end (SE) is split into the twin step-index secondary waveguide cores at the SE=~3*PE with neff=~1.4519. The fibre parameters at the PE are: D=8 μm, diameter of the offset-twin step-index cores (Din)=2 μm, the distance between the centres of the primary waveguide (PW) and the offset step-index core (pitch)=1.667 μm, the refractive index between the PW and the cladding (Dn)=0.0015, and the refractive index between SW and cladding (DN)=0.004. At the secondary end (SE), there are seven possible mode solutions, however only two modes are in the secondary waveguide (SW). The beat length between the fundamental mode (FM) and the closest HOM is ~0.42 cm at the SE.

As shown in the example of FIG. 18 the composite, tapered optical fibres can be used to split beams as well as beam intensity shaping. Twin-spot beams have several important applications such as creating laser welding pools, avoiding porosity in stainless steel welding and laser brazing, and simultaneous soldering of two printed circuit board (PCB) components.

FIG. 19 to the multi-core secondary waveguides is an extension example to FIG. 18. As the core diameters and refractive index of the cores are the same as the FIG. 18 example, the FIG. 19 arrangement results in a super-mode formation as shown in the 2D electric-field intensity plot at the secondary end 1910.

FIG. 20 shows a M-type composite square-core secondary waveguide 2012, which is a combination of a square-ring 2014 waveguide surrounding a square-core 2016 waveguide. The composite, tapered optical fibre 2010 of FIG. 20 over its tapered length has a step-index primary waveguide (PW) and a coaxial combination of two secondary waveguides as a square-ring waveguide surrounding a square-core waveguide. The nearly Gaussian mode with neff=~1.4507 at the primary end (PE) transforms over the tapered length to a flat-top square mode at the interface of the square-core and square-tube/ring, at the secondary end (SE) when the SE=~4*PE with neff=~1.4536. The fibre parameters at the PE are: D=6 μm, external square-ring side=3 μm, internal square-ring side=2 μm, Dn=0.0015, DNc (refractive index of square-core with respect to the cladding)=0.004, DN (refractive index of square-ring with respect to the cladding)=0.006. At the secondary end (SE), there are nine possible mode solutions. The beat length between the FM and the closest HOM is ~0.14 cm at the SE.

Highly-multimoded square-core fibres for flat-top intensity profile square beams are commercially available and are in demand for several applications such as machining, welding, cutting, masking, imaging, astronomical applications, biomedical, and microscopy applications due to their uniform profile and sharp edges intensity profile of the output beam. However, for these commercially available fibres it is the mode-mixing between numerous guided modes which provides the averaging of the light intensity to result in a uniform intensity over the core at output. In contrast and advantageously, the example of FIG. 20 provides a solution to converting a single-mode Gaussian beam into a single-mode flat-top intensity profile square beam.

Figure 22:
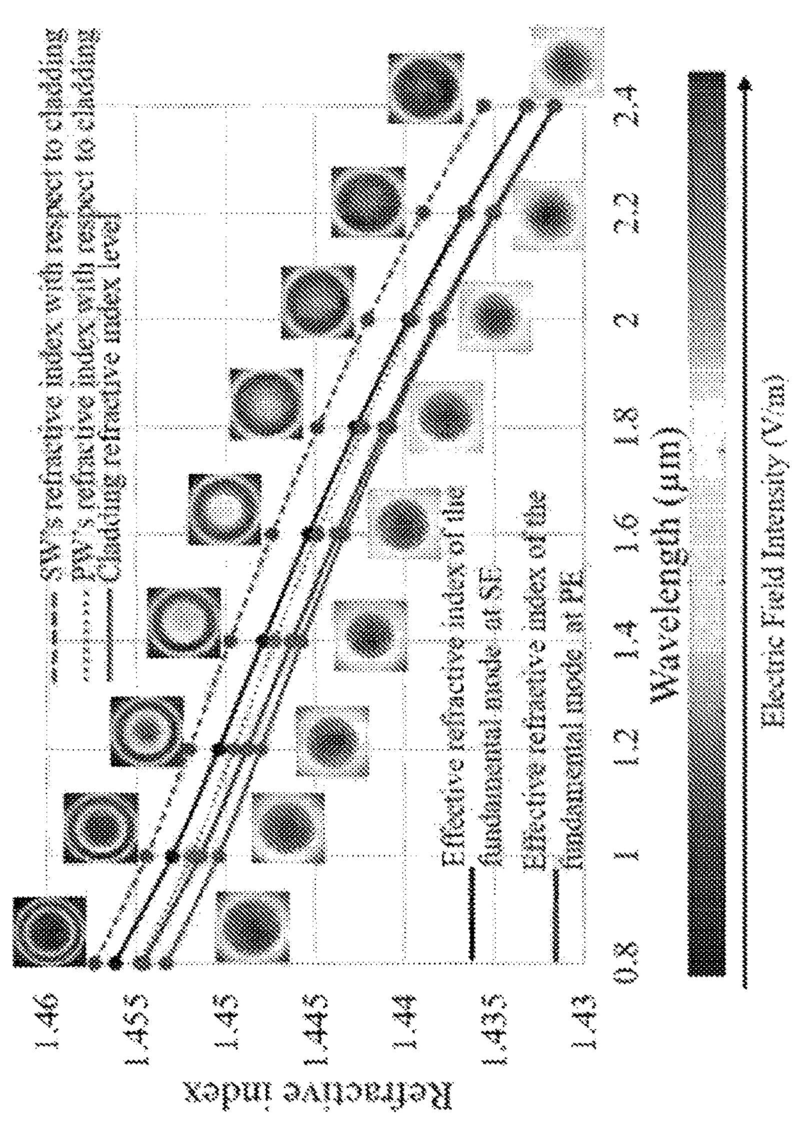
FIG. 22 is a schematic to calculated results for the effective refractive indices of the fundamental mode with respect to wavelength at the primary end and secondary end of an M-type BT fibre of the invention.

In order to investigate the conversion bandwidth, wavelength variation of the beam profiles and effective refractive index of the FM at both ends (PE and SE), has been explored, as shown in FIG. 22. In FIG. 22 the calculated effective refractive indices of the fundamental mode with respect to wavelength at the PE and SE of an M-type BT fibre are shown in the graph. The fibre parameters were at PE: D=8 μm, t=1 μm, DN=0.004, Dn=0.0015, and D=32 μm at SE. The inset plots show the two-dimensional electric field intensity of the FM at the PE and SE for different wavelengths.

In FIG. 22 the refractive index of the cladding (assuming it consists of pure silica and taking Sellmeier's equation into account), primary waveguide (PW) and secondary waveguide (SW) has been plotted for reference. The Inventors have ignored any dispersion due to the dopants into the primary waveguide (PW) and secondary waveguide (SW) required for index raising of the silica. The fibre parameters are the same as discussed in FIGS. 5 and 6. At the secondary end (SE), the well-confined annular mode profile at 0.8 μm wavelength slowly shifts towards the flat-top mode profile at 2.4 μm wavelength. The effective refractive index of the FM nearly reaches the refractive index of the step-index region for longer wavelengths. Similarly, at the primary end (PE), a well-confined nearly flat-top mode profile at 0.8 μm wavelength slowly shifts towards the poorly guiding Gaussian mode profile at 2.4 μm wavelength. The effective refractive index of the FM nearly reaches the refractive index of the cladding region for longer wavelengths. These observations are expected, as V (normalized frequency of optical fibre) is inversely proportional to the operational wavelength. A particular secondary waveguide (SW), which is non-guiding at a particular wavelength, can still guide several modes at shorter wavelengths, therefore beam conversion capability of the BT fibres depends on the wavelength of operation. However, as it can be noted from FIG. 22, these changes are gradual, therefore a reasonable conversion-bandwidth can be expected from a particular fibre. For an example, FIG. 22 ensures a significant ~300 nm (from ~0.9 to ~1.2 μm) wavelength bandwidth over which a near-Gaussian mode profile at the primary end (PE) can be converted to a near-annular mode profile at the secondary end (SE). The exact value of the bandwidth will vary, as it depends on the acceptable definition of a particular shaped beam profile in terms of, for instance, beam width, distance of annular region from centre etc. For broadband transmission, it will confine shorter wavelengths in the secondary waveguide (SW) and will reach to the primary waveguide (PW) for larger wavelengths, in between, will pass through the interface region of the secondary-primary waveguide (SW-PW). Therefore, it can act as a spatial filter for broadband supercontinuum light sources. M-type fibres are known for their non-linear applications, therefore a concatenation of M-type to M-type-BT fibre can be used to generate a spatially filtered broadband spectrum.

Figure 23:
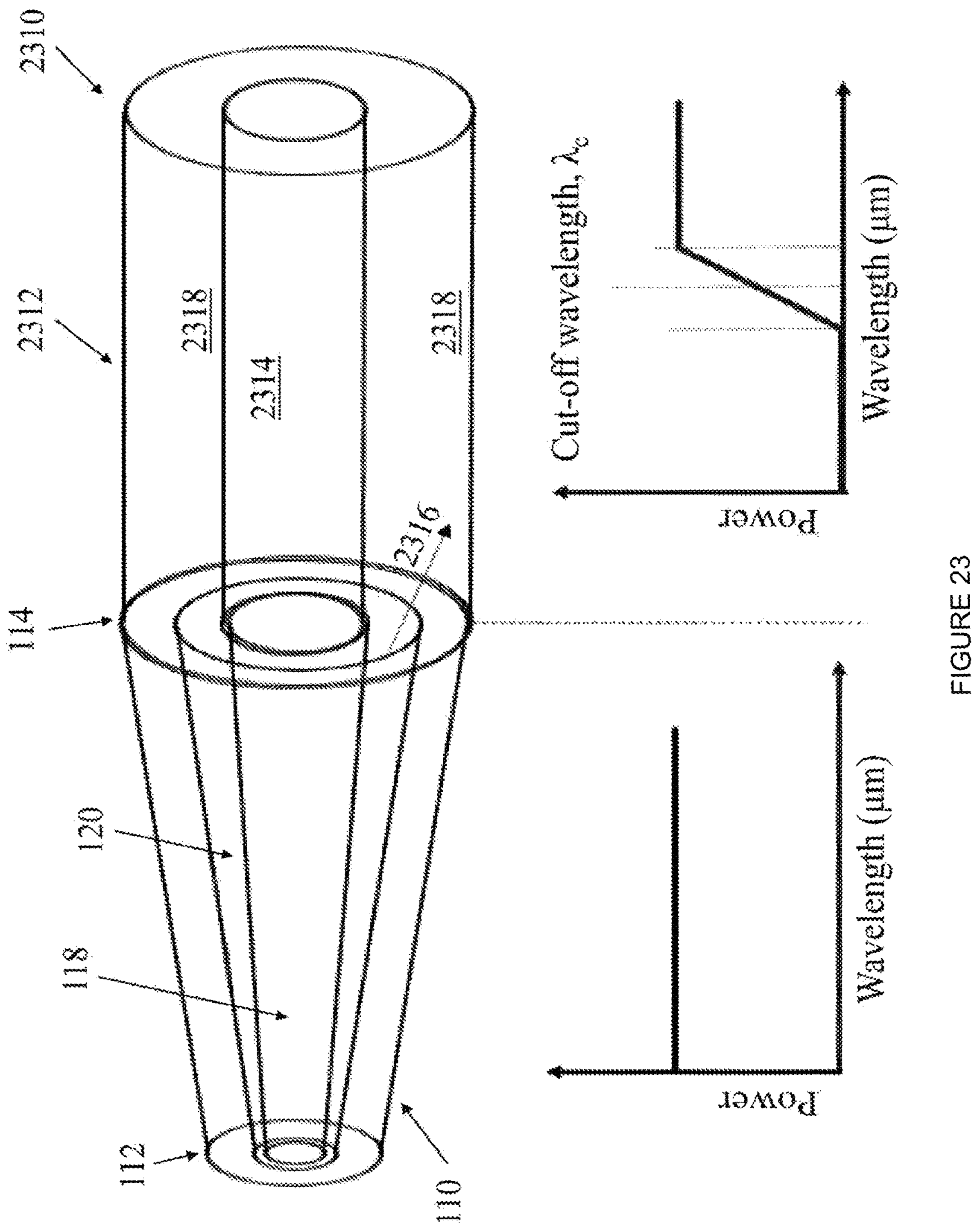
FIG. 23 is a schematic of a long-pass filter incorporating the composite, tapered optical fibre of the invention.

Long Pass Filter: FIG. 23 shows a schematic of a long pass filter 2310, where a M-type BT fibre 110 has been spliced at the SE to a conventional/standard step-index fibre 2312 with high-index polymer coating, (not shown). The core 2314 of the step-index fibre has the same diameter and NA as of the primary waveguide (PW) 118 of the M-type BT fibre at the secondary end (SE) 114. In this arrangement, for wavelengths where the FM is in the secondary waveguide (SW) 120 at the SE 114, most of the light will couple, as shown by the arrow 2316 to the cladding 2318 of the step-index fibre for wavelengths less than a critical wavelength, $\lambda<\lambda_c$. This effect will gradually decrease with increasing wavelength, as the FM will gradually shift to the primary waveguide (PW) and will result in increased coupling with the core of the step-index fibre 2312 as shown in FIG. 23; also as shown in the inset graphs of power versus wavelength below the respective sections of the long pass filter 2310. That is, as $\Delta>\Delta_c$ the primary waveguide 118 couples to the core 2314 of the conventional fibre. The cut-off wavelength ($\lambda_c$) can be defined below (or above) which less (or more) than 50% of power at the secondary end (SE) will be obtained at the output end of the step-index fibre. Further, a range of cut-off wavelengths such as lower cut-off wavelength ($\lambda_{lower-c}$) below which only 10% of the power and upper cut-off wavelength ($\lambda_{upper-c}$) above which 90% of the power at the SE end will be obtained at the output end of step-index fibre, can be defined. This arrangement may not offer an ideal sharp edge cut-off wavelength but can be useful for many applications requiring all-fiberized filters.

Figure 24A:
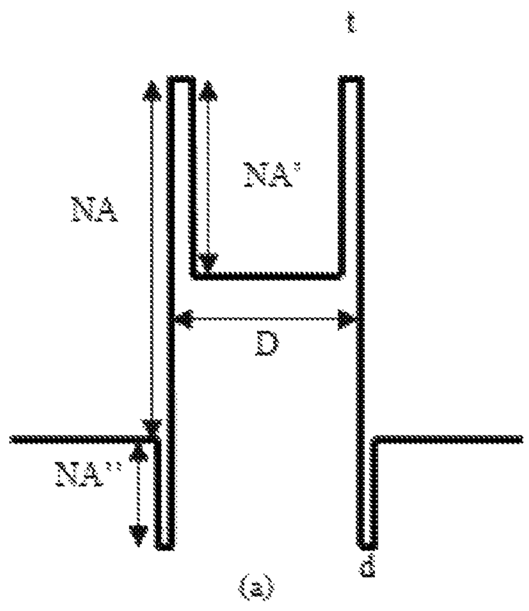
FIGS. 24A and 24B are refractive index schematics of the composite, tapered optical fibre incorporating an additional trench surrounding the secondary waveguide.
Figure 24B:
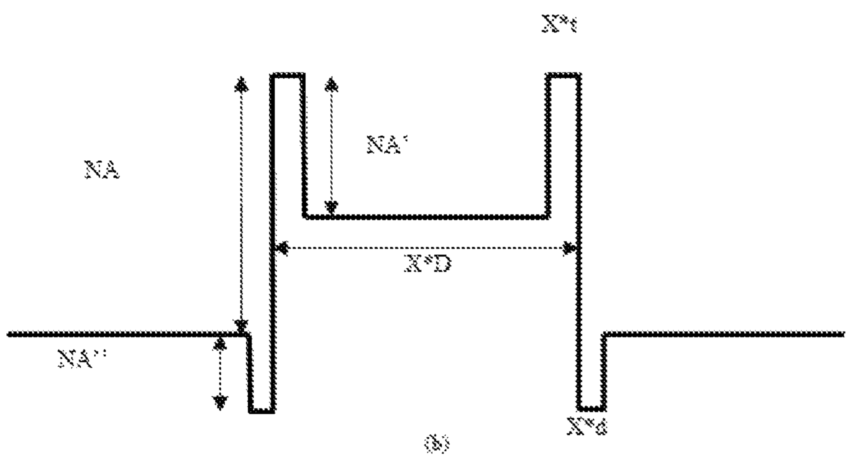

Four layers M-type BT fibres (additional trench): A tapering can merely change the physical dimensions of waveguide but not the real refractive indices. However, a thin trench surrounding the secondary waveguide as shown here in FIG. 24 can increase the effective NA of fibre at the secondary end compared to the primary end. Though the refractive index of the trench is the same for both the cases, the increased width of the trench at the secondary end (SE) is enough to increase the effective NA. This can reduce the required difference in outer diameters of primary to secondary end to achieve a transition of the fundamental mode from primary to secondary waveguide or vice versa.

Figure 25:
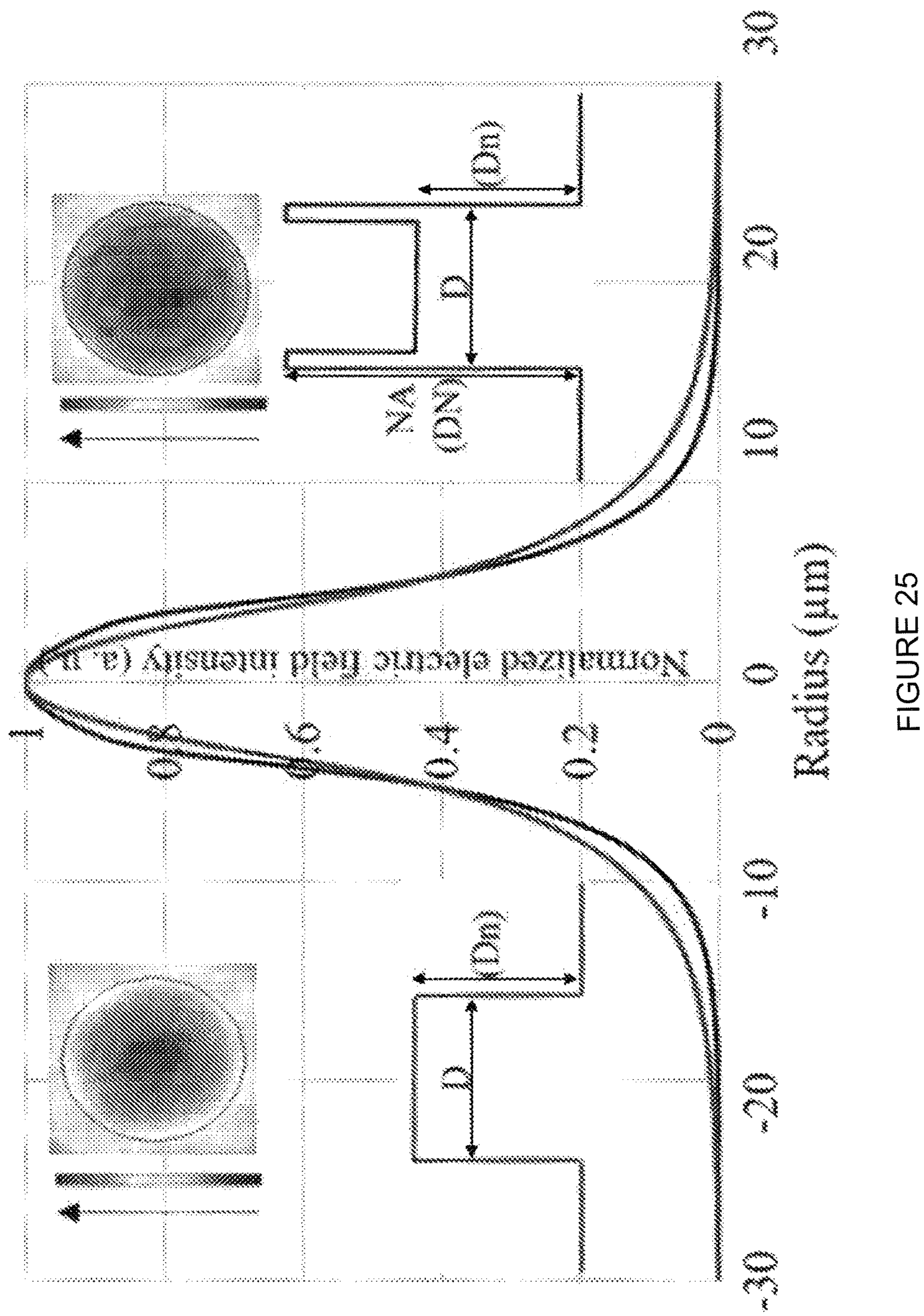
FIG. 25 is a schematic of a normalized electric field intensity of the fundamental for a step-index and M-type BT fibre of the invention at a splicing point.

Low loss coupling to the BT fibres: The pigtail fibre of a light source can be spliced to the BT fibres. Usually, the splice loss for the same material fibres is very low (<0.1 dB) if the mode profiles of both fibres match well. The power transmission coefficient from the transmitting fibre to the receiving fibre is given by (assuming same material for both fibres):

$$T = \left(2\pi \int_0^\infty \Psi_1(r)\,\Psi_2(r)\; r\; dr\right)^2,$$

where $\psi_1$ and $\psi_2$ are the normalized scalar electric field of the modes. FIG. 25 compares the normalised electric field intensities for a step-index fibre with a M-type BT fibre at the input end with same the D and Dn. The calculated power transmission coefficient is very high, T=~0.97, leading to a low loss of ~0.13 dB loss per splice. The fibre parameters are same as discussed in FIGS. 5 and 6. This coupling efficiency will remain high for any BT fibre, as long as the parameters of the secondary core at the input end are small enough and the parameters of the primary core are close enough to the core of transmitting fibre.

Figure 21:
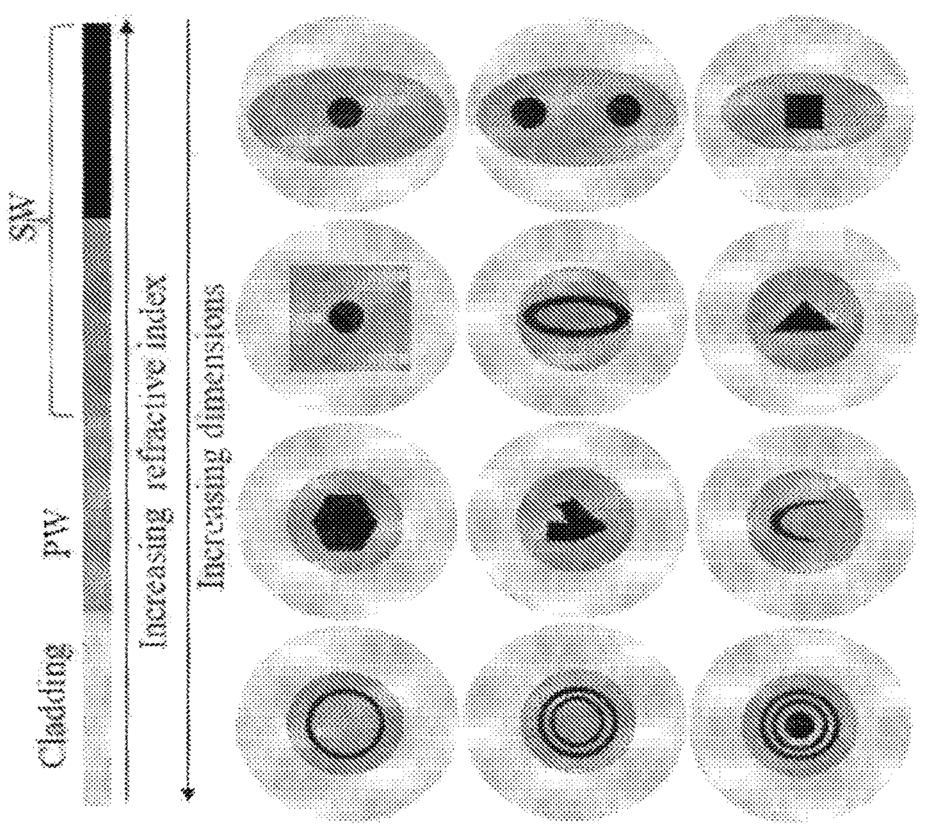
FIG. 21 is schematic diagram to further examples of arrangements of the primary waveguide/s and the secondary waveguide/s to geometry and number of waveguides of the composite, tapered optical fibre.

FIG. 21 is a schematic to further examples of secondary waveguides with different: transverse cross-sectional shapes, position within the primary waveguide, a composite secondary waveguide and multiple secondary waveguides. Furthermore, examples to a non-circular primary waveguide section are also provided. It will be readily appreciated that a variety of secondary cross-sectional shapes, positioning and other composite waveguide arrangements and combinations may be arbitrarily designed and still be within the scope of the invention to a composite, tapered optical fibre as described herein. For example, further arbitrary shapes for an application may be used as follows: oval, star, polygonal, D-shape, etc. That is, in addition to modifying the beam intensity profile the cross-sectional shapes and dimensions of the beam may be readily varied and tailored by changing the dimensions and geometries of the primary and secondary waveguides. The lowest row of FIG. 21 shows two examples, where a primary waveguide has multiple, same or different secondary waveguides.

As taught herein it is now possible to design a composite tapered fibre in such a way that the primary waveguide at the primary end is single-mode and the secondary waveguide at the secondary end can also be effectively single-mode, provided an adiabatic criterion has been fulfilled in tapering-up the fibre. As taught herein, such a composite optical fibre can provide adiabatic conversion of the mode from either end without exciting any higher order modes (HOMs) over a length much larger than the beat length.

The inventors have also noted that either or both waveguides may be operated as multimodal at their respective ends. Furthermore, whilst a step-index profile has been described herein it will be readily appreciated that approximations to the step-index profile may be used as well as other profiles as shown by way of example in FIG. 21.

It is known that the wave-guidance is directly proportional to the product of the core size and the NA (numerical aperture). Advantageously, smaller dimensions with higher NA or larger dimensions with smaller NA may be achieved with the invention as described herein.

In the above it has been principally described narrow-linewidth operation of the composite, tapered optical fibre. For broadband transmission, the invention may be applied to guide wavelengths beyond a cut-off in the secondary waveguide (SW) and below a cut-off in the primary waveguide (PW). That is, the invention may be used to act as a spatial filter for broadband, supercontinuum light sources.

The inventors have further noted that the invention of composite, tapered optical fibres as described herein is readily and inventively distinguished from other optical arrangements such as photonic lanterns as proposed in the published article: T. A. Birks, I. Gris-Sánchez, S. Yerolatsitis, S. G. Leon-Saval, and R. R. Thomson, "*The Photonic Lantern*," Advances in Optics and Photonics 7, 107-167 (2015). In photonic lanterns, light from a terminating multimode core is distributed to multiple single-mode cores. In clear contrast, the composite, tapered optical fibre of the invention along the tapered length shifts one particular mode from one waveguide to the other waveguide that are parallel along the tapered length.

Arbitrary, non-circular BT or composite, tapered optical fibre as described herein may be fabricated by stack and draw techniques.

The invention as described herein may be applicable and scalable to different waveguides such as planar waveguides, photonic crystal fibres, photonic bandgap fibre, and the like.

Preliminary Experimental Results: To validate the theoretical and simulation results described herein the inventors fabricated a tapered, composite waveguide. Initially, the inventors fabricated a fibre preform in the configuration of FIG. 1 but without the taper, that is the diameters of the coaxial primary and secondary waveguides did not vary along their lengths. A fibre preform is the macroscopic precursor that is subsequently thermally drawn into the fibre. The fibre preform was fabricated using a modified chemical vapor deposition (MCVD) process. The fibre preform had an outer diameter of ~11.50 mm and then the drawn tapered fibre from it had an outer diameter varying from ~135 μm to 300 μm.

Figure 26A:
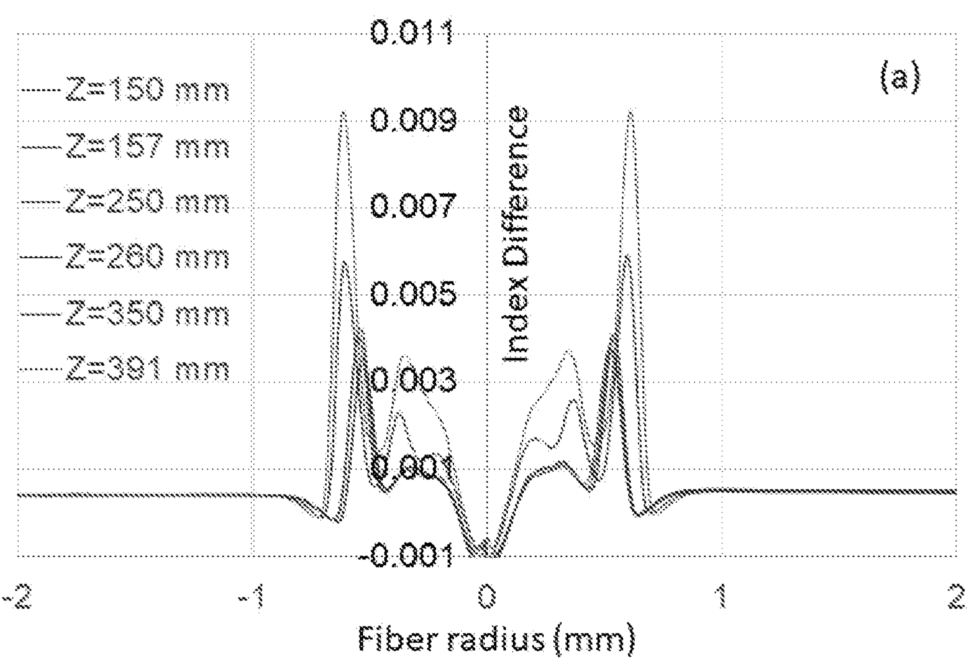
FIGS. 26(*a*) and (*b*) are schematics to measured Refractive Index Profile (RIP) plots transversely across a fibre preform versus longitudinal length, Z, along the fibre preform.
Figure 26B:
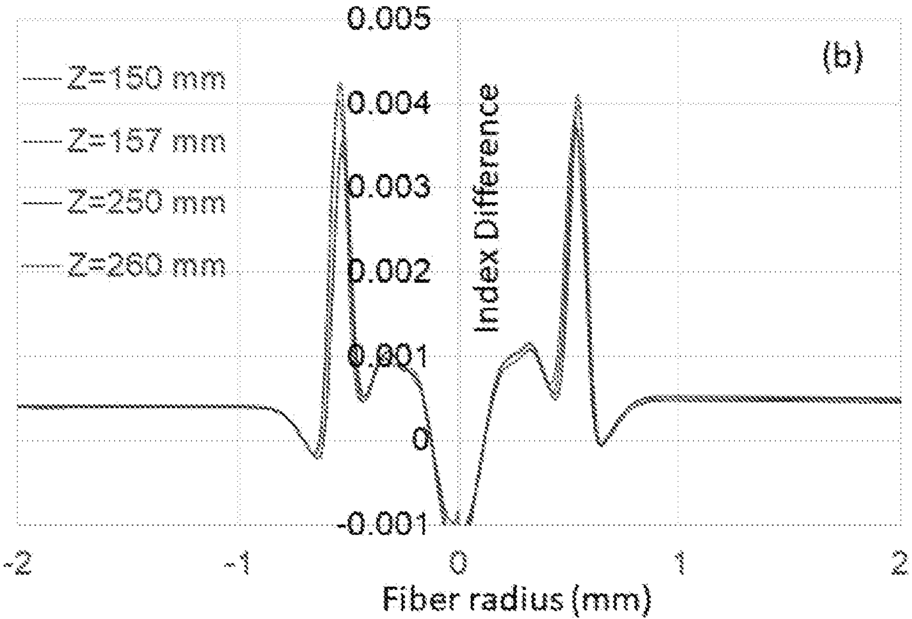

FIGS. 26 (*a*) and (*b*) are measured Refractive Index Profile (RIP) plots transversely across the fibre preform at different longitudinal distances, Z, along the fibre preform. FIG. 26(*a*) is the RIP at distances Z=150 to 391 mm. For this length of the fibre preform it can be seen that the fibre RIP profile had a slight non-uniformity along its length, a central refractive index dip due to the evaporation of the Germanium (Ge), and some asymmetry. FIG. 26(*b*) is the RIP of a shorter length between points Z=150 to 260 mm, where the fibre preform RIP had good uniformity.

Figure 27A:
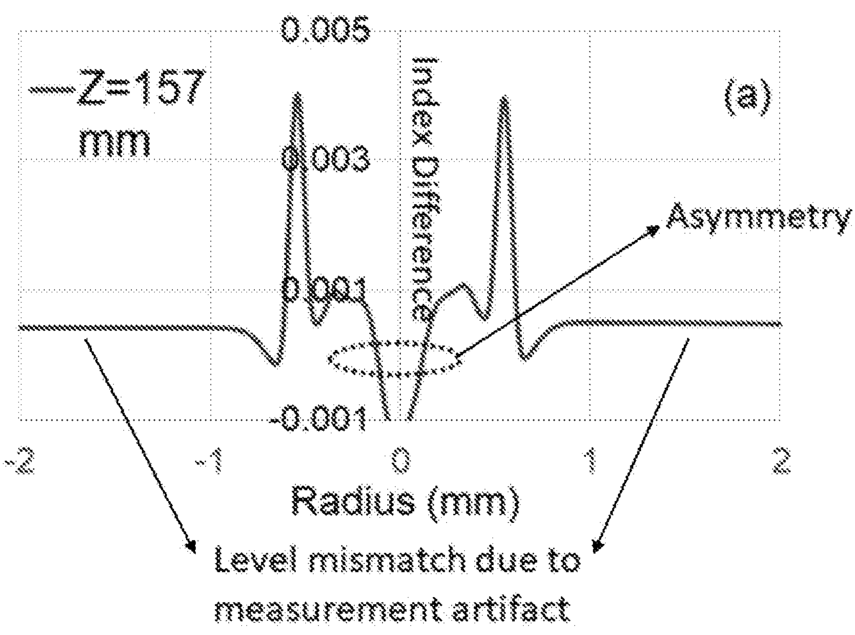
FIGS. 27 (*a*) and (*b*) are schematics to the measured RIP plots respectively for Z=157 mm and Z=260 mm from FIGS. 26 (*a*) and (*b*).
Figure 27B:
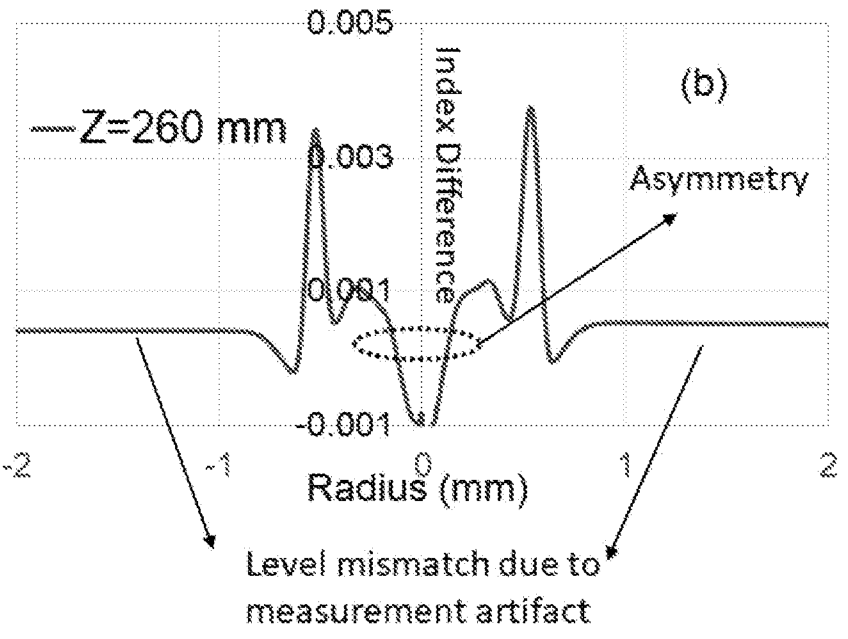
Figure 28A:
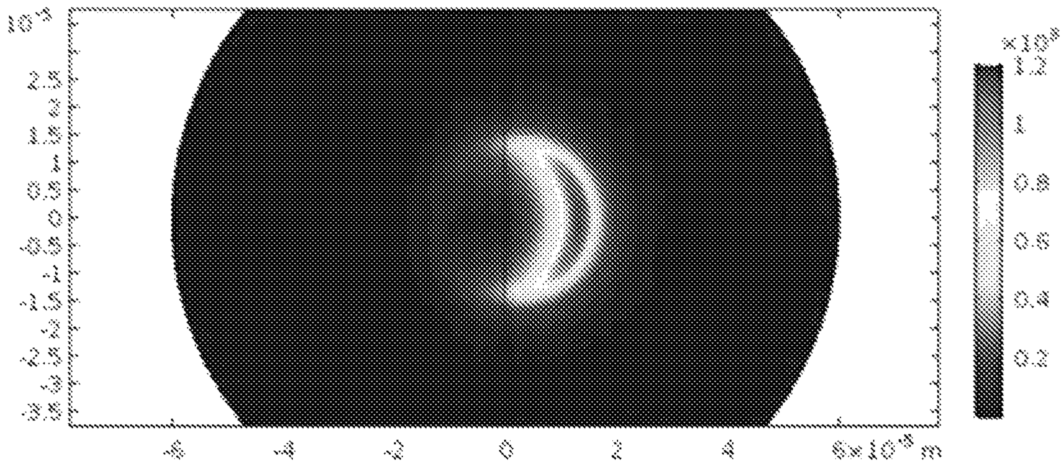
FIGS. 28 (*a*) to (*d*) are schematic representations of simulation results to FIGS. 26 and 27 with a refractive index offset and varying diameter of curvature of the composite fibre.
Figure 28B:
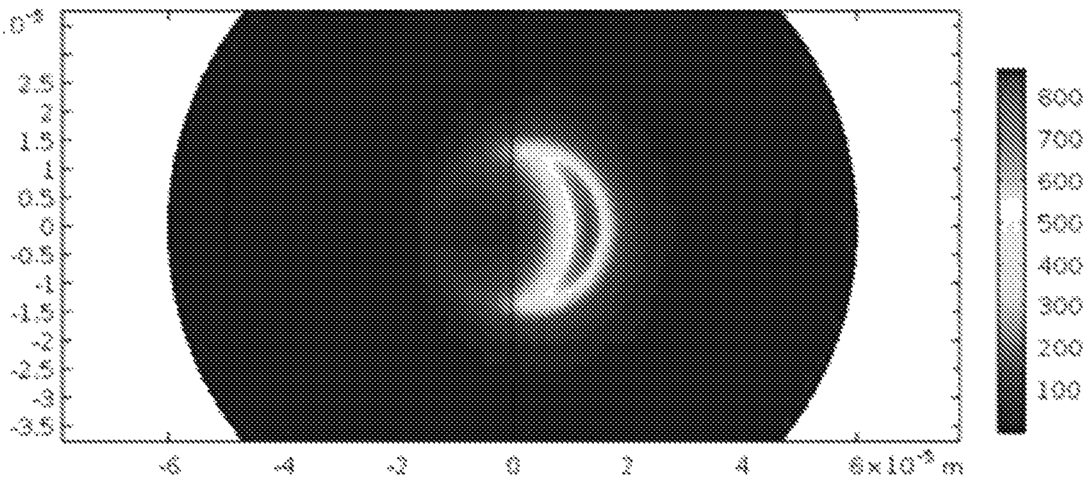
Figure 28C:
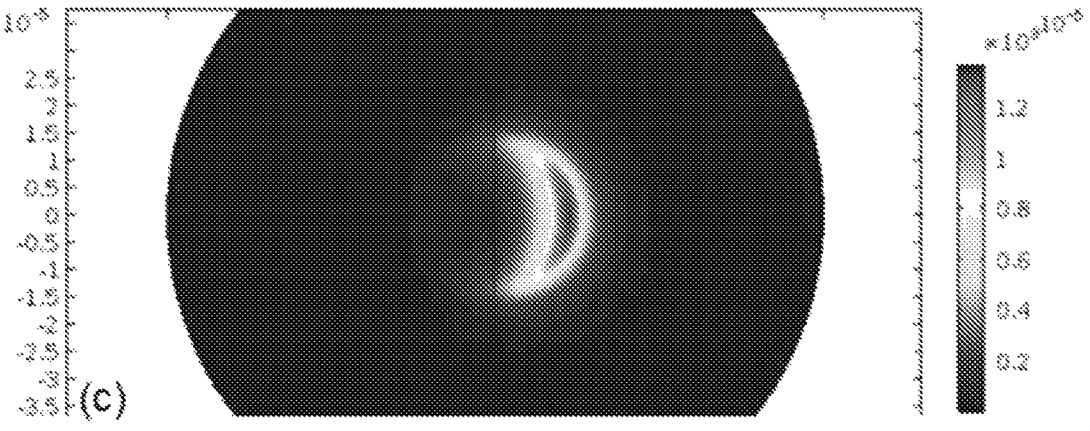
Figure 28D:
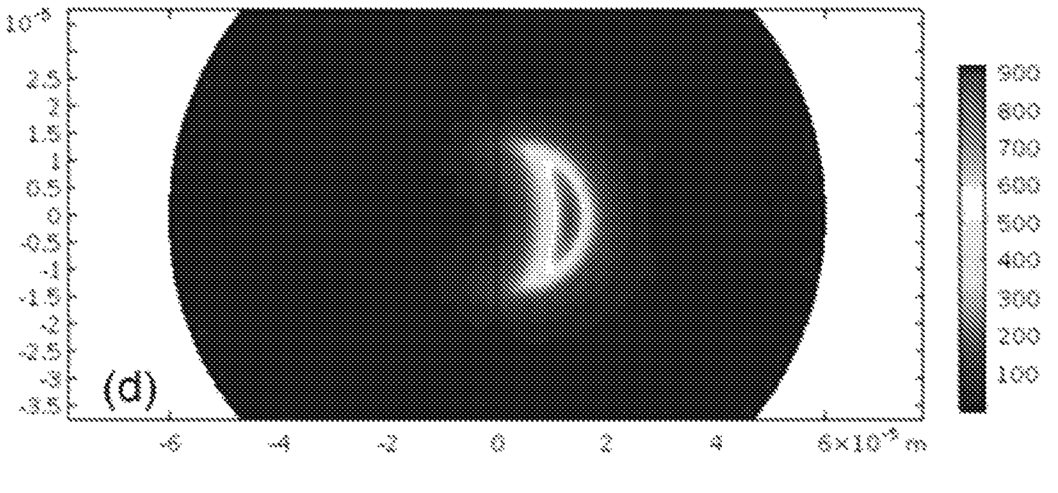
Figure 29A:
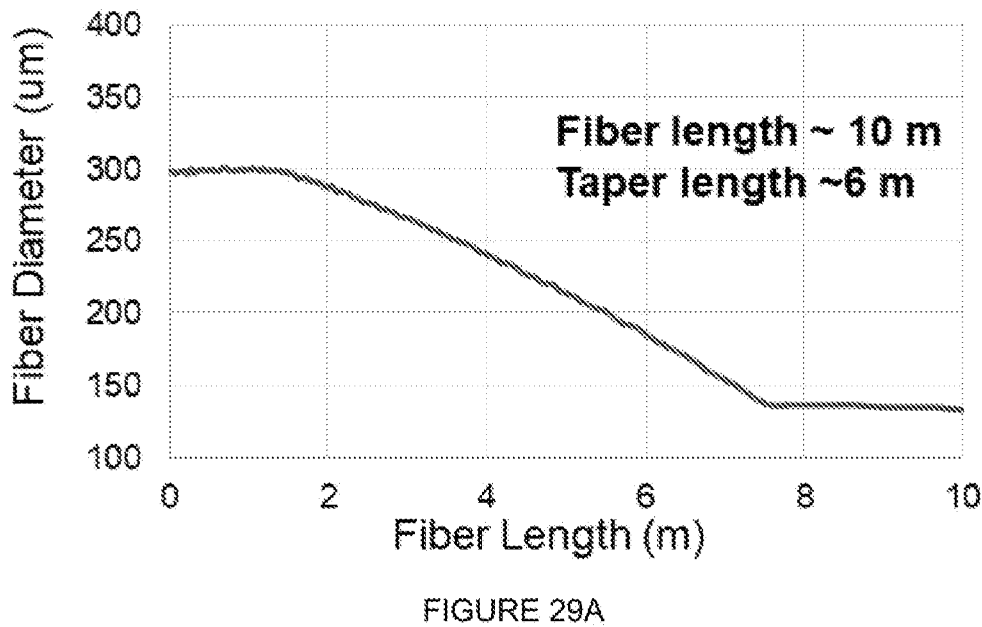
FIGS. 29 (*a*) to (*d*) are schematic graphs to the outer diameter variation of the drawn tapered fibre along its length.
Figure 29B:
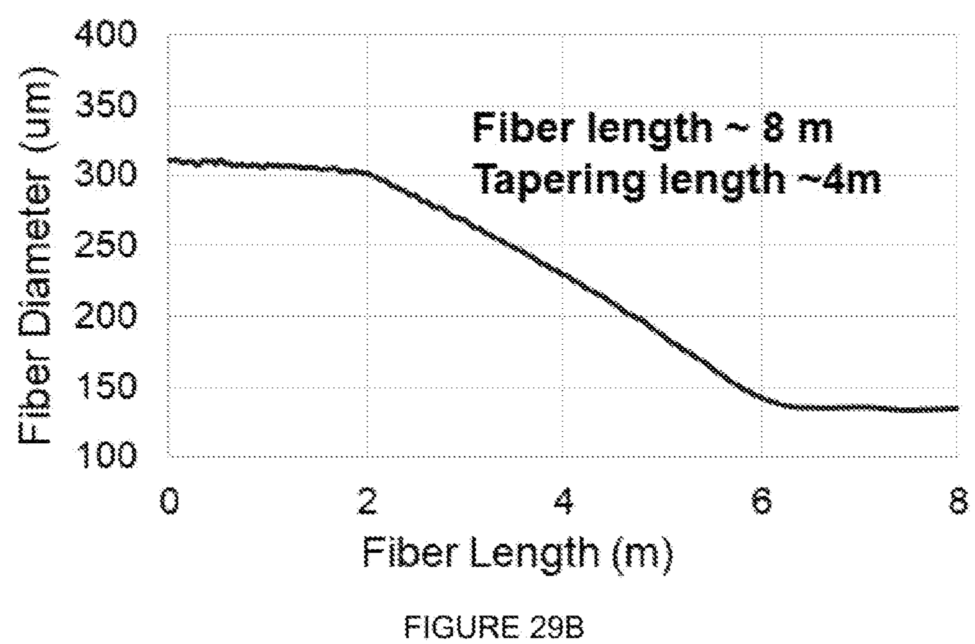
Figure 29C:
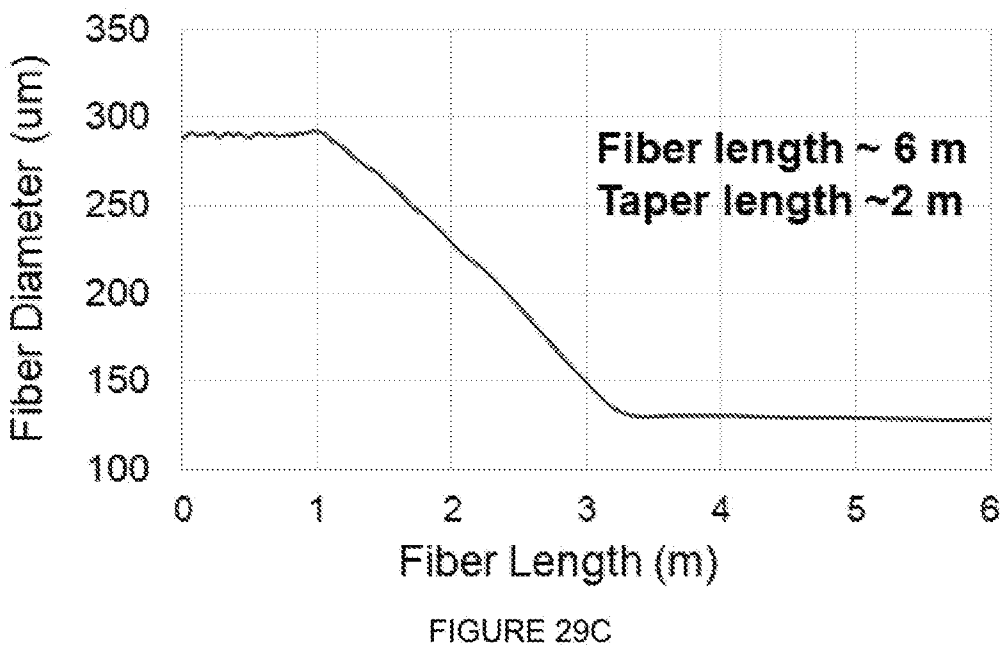
Figure 29D:
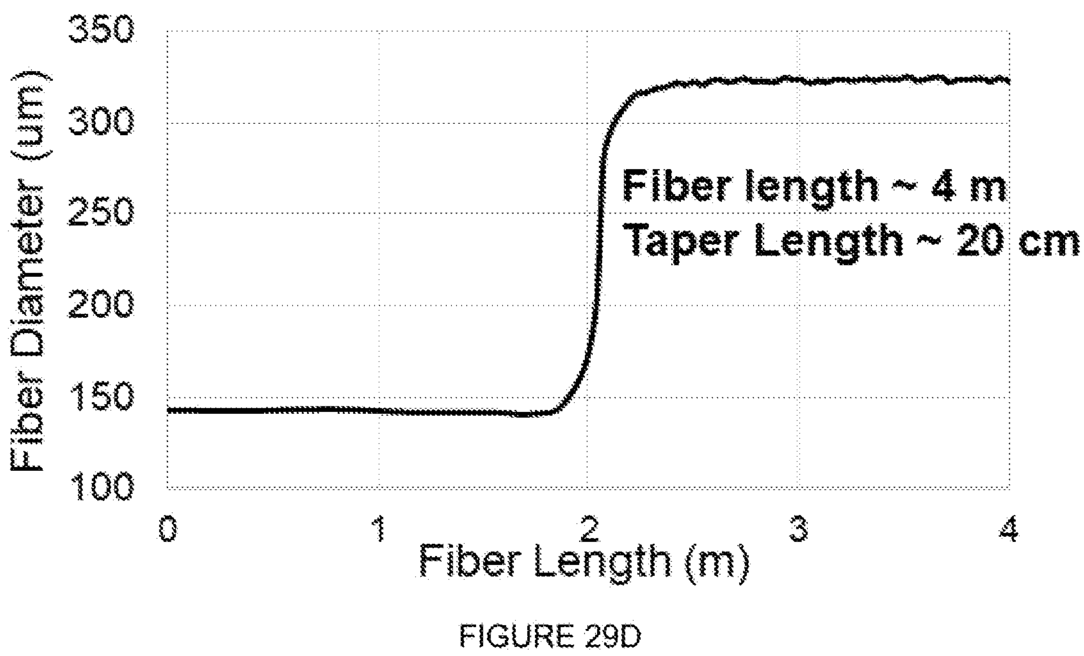

FIGS. 27 (*a*) and (*b*) are the measured RIP plots respectively for Z=157 mm and Z=260 mm shown separately from FIGS. 26 (*a*) and (*b*) for clarity. The RIP measurement for each of FIGS. 27(*a*) and 27(*b*) show some measurement artifacts and interestingly an asymmetrical deposition as indicated in each of the FIGS. 27 (*a*) and (*b*).

To further validate the theoretical and simulation models the inventors simulated the measured RIPs of FIGS. 26 and 27 after scaling down to a drawn fibre diameter of 300 μm and correcting the measurement artifact by adding a refractive index (~0.0001) offset between the left and right sides of the composite waveguide.

FIGS. 28 (*a*) to (*d*) show from the simulation a series of two-dimensional electric field intensity profiles of the fundamental mode for (a) uncoiled/straight fibre, (b) 40 cm diameter of curvature, (c) 20 cm diameter of curvature and (d) 10 cm diameter of curvature composite waveguide lengths. For each of FIGS. 28 (*a*) to (*d*) the refractive index offset is +0.0001 from left to right. Interestingly, the intensity profiles have a crescent shape rather than an annular beam due to the introduced asymmetry in the refractive index profile for all the bend diameters.

The fibre preform of FIGS. 26 and 27 was then drawn using the more uniform section of Z=150 to 260 mm. A draw tower was used with the fibre being tapered during drawing by controlling a feed speed, a drawing speed, and a furnace temperature. FIGS. 29 (*a*) to (*d*) are graphs to the outer diameter variation of the drawn tapered fibre along its length. In particular, FIG. 29 (*a*) fibre length ~10 m and taper length ~6 m, (b) fibre length ~8 m and tapering length ~4 m, (c) fibre length ~6 m and tapering length ~2 m, and (d) fibre length ~6 m and tapering length ~2 m. The different lengths of the tapered, composite fibres for the same diameter variation (from one to the other end) were drawn to investigate the impact of a tapering profile over mode conversion. That is, with respect to the rate of change of the composite waveguide taper diameter with length.

Figures 30A, 30B, 30C, 30D:
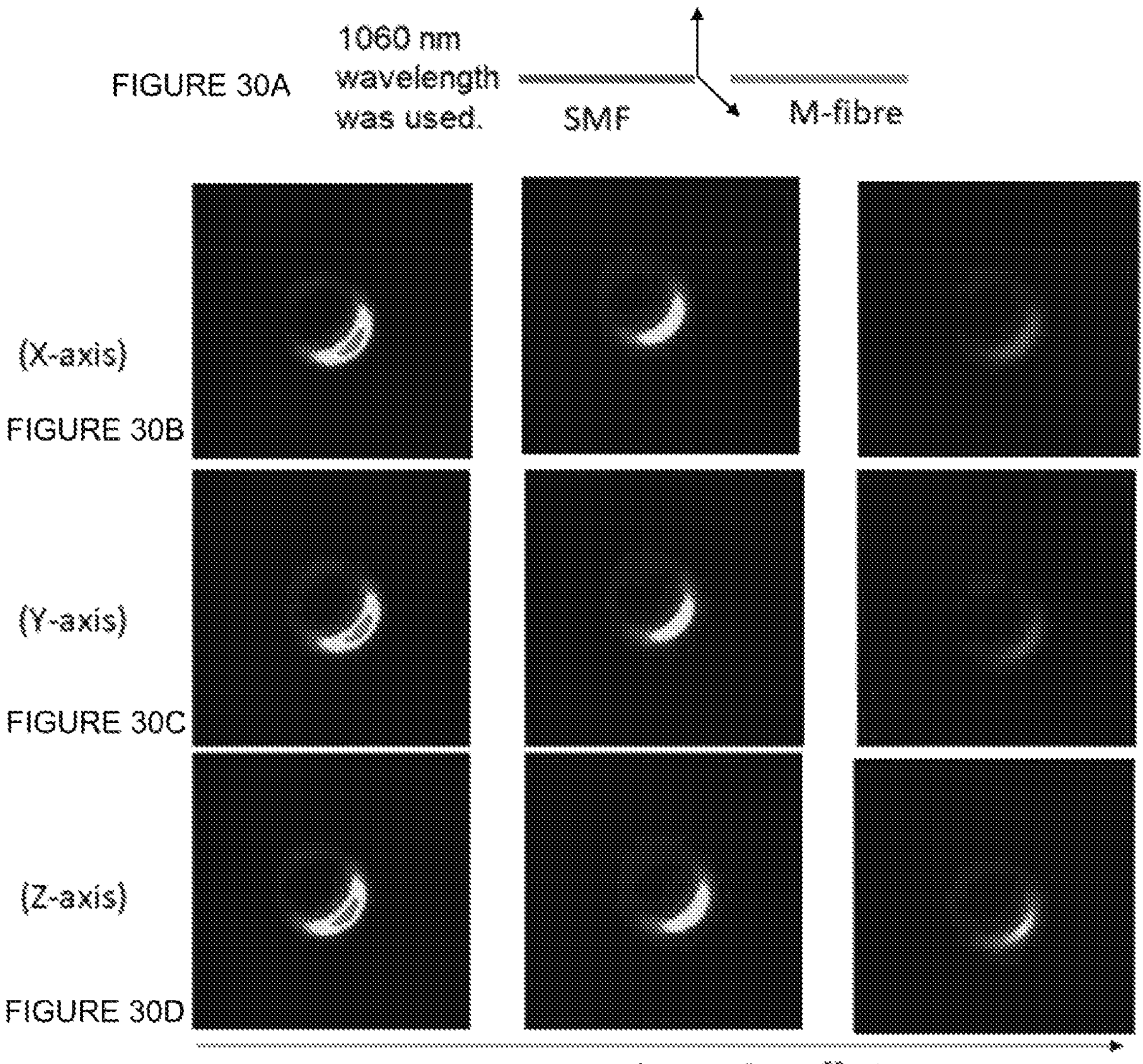
FIG. 30 (*a*) is a schematic representation of an experimental set-up to characterize the drawn, tapered composite fibre of FIGS. 26 and 27.

The fabricated, drawn fibres were characterized using an experimental set-up as schematically shown in FIG. 30 (*a*). The direction Z corresponds to the longitudinal length of the tapered composite fibre with X and Y axes transverse to the fibre length. A 1060 nm fibre coupled laser was used as a light source. The light was launched into the fibre under test (FUT) using a butt coupling between the pigtail fibre of the laser source and the FUT.

FIGS. 30 (*b*) to (*d*) are the measured, two-dimensional electric field profiles of the output beam with respect to different launching offsets in the butt coupling scheme of FIG. 30 (*a*). FIGS. 30 (*b*) to (*d*) are the respective measured profiles with X, Y, and Z variation with increasing offset from left to right. This demonstrates that only the intensity changes, but the profiles remain the same. These measurements demonstrate that the output is a single mode, even though the output observed was crescent shaped because of the fabrication asymmetry of the RIP and as observed for the simulation result. The inventors did not observe any impact of tapering length on the output of the fibre from ~20 cm tapering length to several metres.

In order to further confirm that only a single mode was launched into the FUT, the output beam profile after 10 cm propagation into the FUT was measured. FIG. 31 (*a*) schematically shows the experimental set-up of the FUT spliced to the pig tail fibre of the laser source. FIGS. 31 (*b*) and (*c*) are the measured, electric field intensity two-dimensional and three-dimensional plots, respectively, of the output beam after 10 cm of the FUT. As shown in FIGS. 31 (*b*) and (*c*) the output beam profile is Gaussian, this confirms that the excited mode in the FUT is a Gaussian mode.

Figures 32A, 32B, 32C, 32D, 32E, 32F, 32G, 32H:
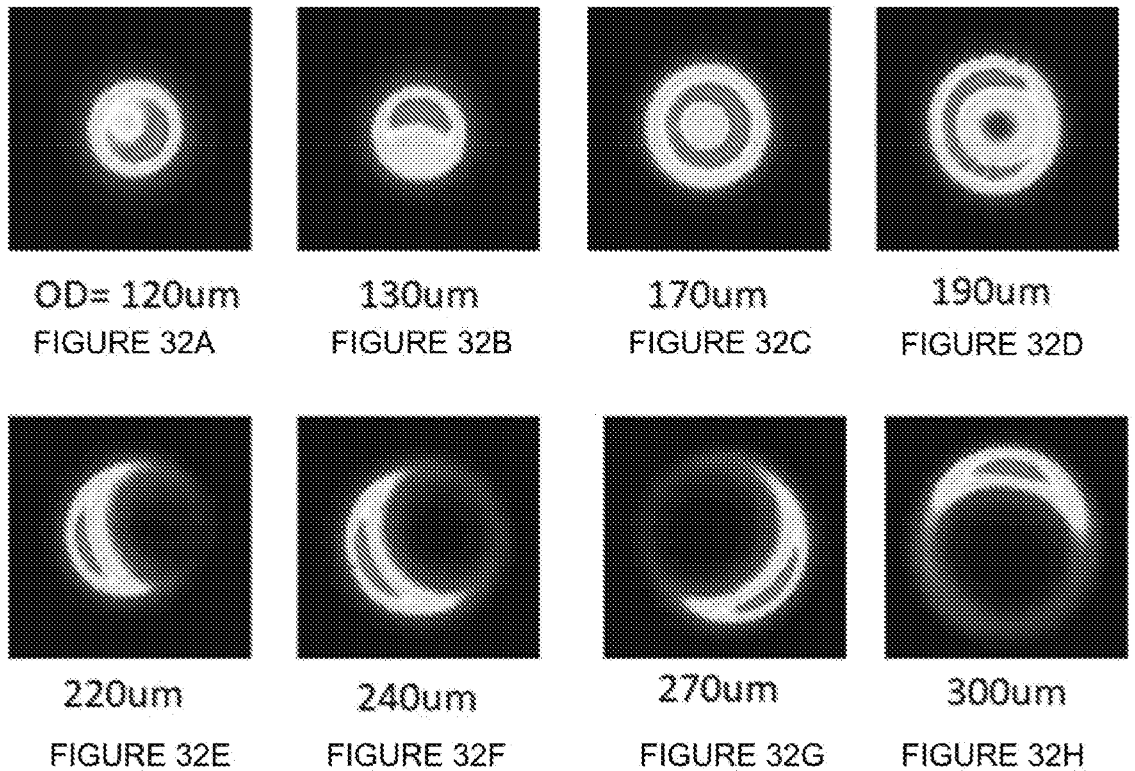
FIGS. 32 (*a*) to (*h*) show the measured, two-dimensional electric field intensity profiles of the output beam at different diameters from 120 to 300 μm of the tapered composite fibre.

The inventors from their theoretical and simulation understandings of the invention expected to observe that the impact of an asymmetrical RIP, the crescent output beam profile of FIGS. 30 (*b*) to (*d*), should be less with a smaller outer diameter of the composite fibre. To verify this, the inventors did cut back measurements of the output beam profiles. That is, successive output measurements for reducing lengths of the composite, tapered fibre by sectioning were done. FIGS. 32 (*a*) to (*h*) show the measured, two-dimensional electric field intensity profiles of the output beam at different diameters from 120 to 300 μm of the tapered composite fibre. As per FIGS. 32(*h*) to 32(*c*), with the decreasing diameter from 300 μm to 170 μm, the annular profile of the output beam interestingly becomes more uniform as shown. However, for less than 170 μm diameter the asymmetry in the output beam increases. For these lesser diameters the mode effective refractive index is at the interface of the ring and core refractive index. If the RIP did not have an asymmetry, then the output beam profile would a flat-top beam at these lesser diameters, as described earlier herein.

A longer wavelength should also reduce the impact of the asymmetry of the refractive index profile. FIGS. 33 (*a*) and (*b*) are the two-dimensional electric field intensity plots respectively for the simulated and the measured output beam profiles at ~1550 nm wavelength. It was apparent to and expected by the inventors and as shown that the output beam profiles are more symmetrical than the profiles measured at the shorter ~1060 nm wavelength.

These preliminary experiments validated the invention to the conversion of the spatial distribution of light within tapered, composite fibres as described herein. Whilst an asymmetry in the fibre preform resulted in less than perfect annular output beams, the theoretical simulation presented herein and the measurement results of above were in agreement with the source and contribution of an asymmetric RIP and the inventors understanding of the invention.

Figure 34:
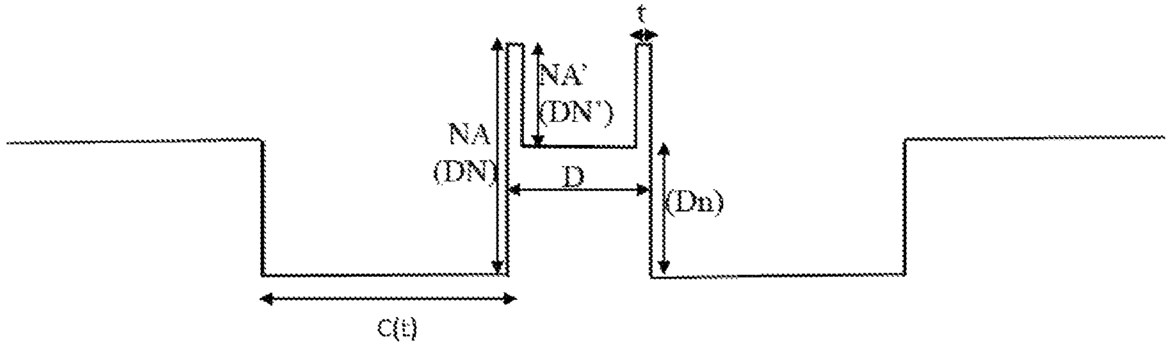
FIG. 34 is a schematic diagram to an alternative refractive index profile for M-type beam tailoring fibres of the tapered composite fibre invention.

FIG. 34 is a schematic diagram to an alternative refractive index profile for M-type beam tailoring fibres of the tapered composite fibre invention. The inventors have proposed to fabricate a fibre preform according to FIG. 34 to eliminate or at least substantially alleviate the problem of Germanium (Ge) evaporation, where both the cladding and core have the same refractive index.

Whilst an asymmetric output beam for the preliminary experimental work was not the immediate objective, as noted with respect to FIG. 21 and elsewhere, asymmetric outputs are also useful for material processing applications. By way of example, we refer to Shalupaev et al., "*The analysis of laser thermospliting of fragile materials by using special geometry beams*", 56(4), 1149-1155, Archives of Metallurgy and materials (2011).

INTERPRETATION

Although the invention has been herein shown and described in what is conceived to be the most practical and preferred embodiments, it is recognized that departures can be made within the scope of the invention, which are not to be limited to the details described herein but are to be accorded the full scope of the appended claims so as to embrace any and all equivalent assemblies, devices, apparatus, articles, compositions, methods, processes and techniques.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise, comprised and comprises" where they appear.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention claimed is:

1. A composite optical waveguide comprising:

at least one primary waveguide; and a secondary waveguide surrounding or within the at least one primary waveguide, wherein the composite optical waveguide is tapered such that the at least one primary waveguide and the secondary waveguide taper together towards an end of the composite optical waveguide, the taper of the at least one primary waveguide and the taper of the secondary waveguide cause a substantial transfer of an optical fundamental mode from one of the at least one primary waveguide and the secondary waveguide to the other of the at least one primary waveguide and the secondary waveguide, and a beam intensity profile of the output optical mode is modified.

2. A composite optical waveguide according to claim 1, wherein the taper of the optical waveguide is slow and steady, so that the composite waveguide fulfils a length-scale and a weak-power criterion to avoid a coupling between the fundamental mode and higher-order modes.

3. A composite optical waveguide according to claim 1, wherein the taper of the composite optical waveguide includes at least one of a reduction in: a diameter of the composite waveguide, a diameter or a thickness of the at least one primary waveguide and a diameter or a thickness of the secondary waveguide.

4. A composite optical waveguide according to claim 1, wherein the taper of the composite optical waveguide is substantially adiabatic with respect to the propagation of the optical mode.

5. A composite optical waveguide according to claim 1, further comprising at least one further secondary waveguide surrounded by or within the at least one primary waveguide.

6. A composite optical waveguide according to claim 1, wherein a refractive index profile between the at least one primary waveguide and the secondary waveguide is at least one of a step-index and a graded-index.

7. A composite optical waveguide according to claim 1, wherein a refractive index of the at least one primary waveguide is less than a refractive index of the secondary waveguide.

8. A composite optical waveguide according to claim 1, wherein the composite optical waveguide is reciprocal with respect to an input end and an output end.

9. A composite optical waveguide according to claim 1, wherein a minimum refractive index difference (DN–Dn) is maintained between the at least one primary waveguide and the secondary waveguide, so that the secondary waveguide is an effective waveguide for at least one of a fixed secondary end or a taper length.

10. A composite optical waveguide according to claim 1, wherein at least two secondary waveguides are within the at least one primary waveguide, whereby a single beam at a primary end of the composite optical waveguide is split into at least two corresponding beams outputted from a secondary end of the composite optical waveguide.

11. A composite, optical fibre comprising of:

at least one primary waveguide, at least one secondary waveguide, and the at least one secondary waveguide surrounds or is within the primary waveguide, wherein the composite optical fibre has a uniformly increasing diameter from one end to another such that the at least one primary waveguide and the at least one secondary waveguide each have a uniformly increasing diameter from one end of the composite optical fibre to another end of the composite optical fibre.

12. A composite optical fibre according to claim 11, wherein a longitudinal axis of the at least one primary waveguide and a longitudinal axis of the secondary waveguide are parallel.

13. A composite optical fibre according to claim 11, wherein a longitudinal axis of the at least one primary waveguide and a longitudinal axis of the secondary waveguide are coaxial.

14. A composite optical fibre according to claim 11, wherein the at least one primary waveguide has a transverse cross-sectional shape that is at least one of circular, elliptical and annular.

15. A composite optical fibre according to claim 11, wherein the at least one secondary waveguide has a transverse cross-sectional shape that is at least one of elliptical, circular and annular.

16. A method of modifying a beam intensity profile of a laser beam by the steps of:

providing at least one secondary waveguide within or surrounded by at least one primary waveguide; and tapering both the primary waveguide and the secondary waveguide together such that a laser beam mode is caused to be transferred from one waveguide to the other along the tapered section;

whereby a beam intensity profile of an input laser beam is modified.

* * * * *